US012739263B2

(12) United States Patent
Barnes et al.

(10) Patent No.: US 12,739,263 B2
(45) Date of Patent: Sep. 15, 2026

(54) REMOTE OPERATIONS FORENSICS

(71) Applicant: SENTINELONE, INC., Mountain View, CA (US)

(72) Inventors: Matan-El Barnes, Kfar Sava (IL); Omri Arnon, Tel Aviv (IL); Amit Zimbalist, Rehovot (IL)

(73) Assignee: SentinelOne, Inc., Mountain View, CA (US)

( * ) Notice: Subject to any disclaimer, the term of this patent is extended or adjusted under 35 U.S.C. 154(b) by 119 days.

(21) Appl. No.: 18/818,019

(22) Filed: Aug. 28, 2024

(65) Prior Publication Data

US 2025/0080551 A1 Mar. 6, 2025

Related U.S. Application Data

(60) Provisional application No. 63/580,341, filed on Sep. 1, 2023.

(51) Int. Cl.
*H04L 9/40* (2022.01)

(52) U.S. Cl.
CPC ................................ *H04L 63/1416* (2013.01)

(58) Field of Classification Search
CPC ....................... H04L 63/1416; H04L 63/1425; G06F 21/552
See application file for complete search history.

(56) References Cited

U.S. PATENT DOCUMENTS

| | | | |
|---|---|---|---|
| 4,979,118 | A | 12/1990 | Kheradpir |
| 5,311,593 | A | 5/1994 | Carmi |
| 5,754,938 | A | 5/1998 | Herz et al. |
| 6,026,474 | A | 2/2000 | Carter et al. |

(Continued)

FOREIGN PATENT DOCUMENTS

| | | | |
|---|---|---|---|
| CN | 103607399 | A | 2/2014 |
| CN | 109446755 | A | 3/2019 |

(Continued)

OTHER PUBLICATIONS

AEfficient Virus Detection Using Dynamic Instruction Sequencesa—May 2009 (Year: 2009).

(Continued)

*Primary Examiner* — Sangseok Park
(74) *Attorney, Agent, or Firm* — Perkins Coie LLP

(57) ABSTRACT

The present disclosure is related to endpoint monitoring and forensic artifact collection. In some embodiments, forensic artifacts and endpoint monitoring data are collected on an endpoint using the same agent. In some embodiments, forensic artifacts are chunked prior to being transferred to a cloud server for analysis. In some embodiments, forensic artifacts are categorized and processed according to the category. In some embodiments, the agent operates in memory and does not write to disk. In some embodiments, the agent does not write to disk during the transfer of forensic artifacts to a cloud server. In some embodiments, a cloud server can enable natural language queries of monitoring data and/or forensic artifacts. In some embodiments, the cloud server provides summaries. In some embodiments, the cloud server identifies the most relevant data in monitoring data and/or forensic artifacts.

20 Claims, 14 Drawing Sheets

(56) References Cited

U.S. PATENT DOCUMENTS 6,154,844 A 11/2000 Touboul et al.
6,157,953 A 12/2000 Chang et al.
6,728,716 B1 4/2004 Bhattacharya et al.
6,804,780 B1 10/2004 Touboul
6,836,888 B1 12/2004 Basu et al.
7,076,696 B1 7/2006 Stringer
7,093,239 B1 8/2006 Van Der Made
7,181,769 B1 2/2007 Keanini et al.
7,225,468 B2 5/2007 Waisman et al.
7,299,294 B1 11/2007 Bruck et al.
7,305,546 B1 12/2007 Miller
7,322,044 B2 1/2008 Hrastar
7,464,407 B2 12/2008 Nakae et al.
7,530,106 B1 5/2009 Zaitsev et al.
7,543,269 B2 6/2009 Krueger et al.
7,546,587 B2 6/2009 Marr et al.
7,574,740 B1 8/2009 Kennis
7,596,807 B2 9/2009 Ptacek et al.
7,596,808 B1 9/2009 Wilkinson et al.
7,665,139 B1 2/2010 Szor et al.
7,710,933 B1 5/2010 Sundaralingam et al.
7,739,516 B2 6/2010 Brender et al.
7,832,012 B2 11/2010 Huddleston
7,882,538 B1 2/2011 Palmer
7,890,612 B2 2/2011 Todd et al.
7,937,755 B1 5/2011 Guruswamy
7,958,549 B2 6/2011 Nakae et al.
7,975,018 B2 7/2011 Unrau et al.
7,984,129 B2 7/2011 Vaught
8,015,605 B2 9/2011 Yegneswaran et al.
8,024,795 B2 9/2011 Newton
8,042,186 B1 10/2011 Polyakov et al.
8,056,134 B1 11/2011 Ogilvie
8,065,722 B2 11/2011 Barford et al.
8,078,556 B2 12/2011 Adi et al.
8,082,471 B2 12/2011 Khan
8,131,281 B1 3/2012 Hildner et al.
8,141,154 B2 3/2012 Gruzman et al.
8,156,556 B2 4/2012 Krishnamurthy
8,171,545 B1 5/2012 Cooley et al.
8,181,033 B1 5/2012 Paul et al.
8,181,250 B2 5/2012 Rafalovich et al.
8,204,984 B1 6/2012 Aziz et al.
8,205,035 B2 6/2012 Reddy et al.
8,214,884 B2 7/2012 Xia et al.
8,230,505 B1 7/2012 Ahrens et al.
8,239,947 B1 8/2012 Glick et al.
8,296,842 B2 10/2012 Singh et al.
8,321,940 B1 11/2012 Pereira et al.
8,327,442 B2 12/2012 Herz et al.
8,353,033 B1 1/2013 Chen et al.
8,370,931 B1 2/2013 Chien et al.
8,375,444 B2 2/2013 Aziz et al.
8,375,447 B2 2/2013 Amoroso et al.
8,413,238 B1 4/2013 Sutton
8,413,241 B2 4/2013 Weeks et al.
8,418,250 B2 4/2013 Morris et al.
8,438,386 B2 5/2013 Hegli et al.
8,438,626 B2 5/2013 Anderson et al.
8,443,442 B2 5/2013 Wang et al.
8,474,044 B2 6/2013 Zawadowskiy et al.
8,488,466 B2 7/2013 Breslin et al.
8,528,057 B1 9/2013 Garrett
8,528,087 B2 9/2013 Hsu et al.
8,538,578 B2 9/2013 Battles et al.
8,539,578 B1 9/2013 Zhou et al.
8,539,582 B1 9/2013 Aziz et al.
8,549,643 B1 10/2013 Shou
8,555,385 B1 10/2013 Bhatkar et al.
8,561,177 B1 10/2013 Aziz et al.
8,566,946 B1 10/2013 Aziz et al.
8,607,054 B2 12/2013 Ramarathinam et al.
8,607,340 B2 12/2013 Wright
8,627,475 B2 1/2014 Loveland et al.
8,677,494 B2 3/2014 Edery et al.
8,713,306 B1 4/2014 Bennett
8,719,937 B2 5/2014 Sundaram et al.
8,725,898 B1 5/2014 Vincent
8,726,389 B2 5/2014 Morris et al.
8,732,296 B1 5/2014 Thomas et al.
8,752,173 B2 6/2014 Yadav
8,789,135 B1 7/2014 Pani
8,793,151 B2 7/2014 Delzoppo et al.
8,806,638 B1 8/2014 Mani
8,821,242 B2 9/2014 Hinman et al.
8,839,369 B1 9/2014 Dai et al.
8,844,041 B1 9/2014 Kienzle et al.
8,849,880 B2 9/2014 Thelen
8,850,582 B2 9/2014 Endoh et al.
8,880,435 B1 11/2014 Catlett et al.
8,881,282 B1 11/2014 Aziz et al.
8,893,278 B1 11/2014 Chechik
8,898,788 B1 11/2014 Aziz et al.
8,904,527 B2 12/2014 Dawson et al.
8,914,406 B1 12/2014 Haugsnes et al.
8,943,594 B1 1/2015 Arrowood
8,949,986 B2 2/2015 Ben-Shalom et al.
8,959,338 B2 2/2015 Snow et al.
8,973,142 B2 3/2015 Shulman et al.
8,984,637 B2 3/2015 Karecha et al.
9,009,829 B2 4/2015 Stolfo et al.
9,027,135 B1 5/2015 Aziz
9,043,920 B2 5/2015 Gula et al.
9,081,747 B1 7/2015 Tabieros et al.
9,117,078 B1 8/2015 Chien et al.
9,118,708 B2 8/2015 Oliphant et al.
9,141,792 B2 9/2015 Baluda et al.
9,166,993 B1 10/2015 Liu
9,185,136 B2 11/2015 Dulkin et al.
9,195,480 B2 11/2015 Wang et al.
9,197,601 B2 11/2015 Pasdar
9,213,838 B2 12/2015 Lu
9,225,734 B1 12/2015 Hastings
9,240,976 B1 1/2016 Murchison
9,246,774 B2 1/2016 Mataitis et al.
9,270,690 B2 2/2016 Kraitsman et al.
9,305,165 B2 4/2016 Snow et al.
9,329,973 B2 5/2016 Bhuyan
9,330,259 B2 5/2016 Klein et al.
9,332,023 B1 5/2016 Wang
9,356,942 B1 5/2016 Joffe
9,356,950 B2 5/2016 Vissamsetty et al.
9,369,476 B2 6/2016 Chekina et al.
9,386,034 B2 7/2016 Cochenour
9,398,001 B1 7/2016 Tidd
9,407,602 B2 8/2016 Feghali et al.
9,413,721 B2 8/2016 Morris et al.
9,420,002 B1 8/2016 McGovern et al.
9,430,646 B1 8/2016 Mushtaq et al.
9,432,360 B1 8/2016 Triandopoulos et al.
9,438,614 B2 9/2016 Herz
9,495,188 B1 11/2016 Ettema et al.
9,503,470 B2 11/2016 Gertner et al.
9,547,516 B2 1/2017 Thakkar et al.
9,578,045 B2 2/2017 Jaroch et al.
9,591,006 B2 3/2017 Siva et al.
9,601,000 B1 3/2017 Gruss et al.
9,602,531 B1 3/2017 Wallace et al.
9,606,893 B2 3/2017 Gupta et al.
9,607,146 B2 3/2017 Sridhara et al.
9,609,019 B2 3/2017 Vissamsetty et al.
9,628,498 B1 4/2017 Aziz et al.
9,641,544 B1 5/2017 Treat et al.
9,641,550 B2 5/2017 Kraitsman et al.
9,661,023 B1 5/2017 Fang et al.
9,705,904 B1 7/2017 Davis et al.
9,710,648 B2 7/2017 Weingarten et al.
9,712,547 B2 7/2017 Touboul et al.
9,749,349 B1 8/2017 Czarny et al.
9,769,204 B2 9/2017 Vissamsetty et al.
9,772,832 B2 9/2017 Rubio
9,779,603 B1 10/2017 Subramanian et al.
9,781,148 B2 10/2017 Mahaffey et al.
9,807,092 B1 10/2017 Gutzmann

(56) References Cited

U.S. PATENT DOCUMENTS 9,807,115 B2 10/2017 Kolton et al.
9,813,451 B2 11/2017 Honda et al.
9,871,766 B2 1/2018 Syed et al.
9,877,210 B1 1/2018 Hildner et al.
9,888,032 B2 2/2018 Dekel et al.
9,898,763 B1 2/2018 Vaynblat et al.
9,935,968 B2 4/2018 Pal et al.
9,942,270 B2 4/2018 Vissamsetty et al.
10,025,928 B2 7/2018 Jaroch et al.
10,033,766 B2 7/2018 Gupta et al.
10,044,675 B1 8/2018 Ettema et al.
10,102,374 B1 10/2018 Cohen et al.
10,146,833 B1 12/2018 Muniswamy et al.
10,169,586 B2 1/2019 Maciejak et al.
10,193,920 B2 1/2019 Satish et al.
10,237,282 B2 3/2019 Nelson et al.
10,250,636 B2 4/2019 Vissamsetty et al.
10,257,224 B2 4/2019 Jaroch et al.
10,284,591 B2 5/2019 Giuliani et al.
10,375,110 B2 8/2019 Vissamsetty et al.
10,382,484 B2 8/2019 Shayevitz et al.
10,417,424 B2 9/2019 Cohen et al.
10,462,171 B2 10/2019 Weingarten et al.
10,476,891 B2 11/2019 Vissamsetty et al.
10,509,905 B2 12/2019 Gupta et al.
10,542,044 B2 1/2020 Vissamsetty et al.
10,567,431 B2 2/2020 Vissamsetty et al.
10,574,698 B1 2/2020 Sharifi Mehr
10,599,842 B2 3/2020 Vissametty et al.
10,599,844 B2 3/2020 Schmidtler et al.
10,602,805 B2 3/2020 Schneider et al.
10,609,074 B2 3/2020 Vissamsetty et al.
10,645,099 B1 5/2020 Ciubotariu
10,664,596 B2 5/2020 Weingarten et al.
10,757,090 B2 8/2020 Kahol et al.
10,762,200 B1 9/2020 Salem et al.
10,769,267 B1 9/2020 Li et al.
10,826,941 B2 11/2020 Jain et al.
10,841,325 B2 11/2020 Weingarten et al.
10,855,671 B2 12/2020 Kahol et al.
10,938,854 B2 3/2021 Strogov et al.
10,977,370 B2 4/2021 Cohen et al.
11,032,301 B2 6/2021 Mandrychenko et al.
11,038,658 B2 6/2021 Vissamsetty et al.
11,171,974 B2 11/2021 Gertner et al.
11,210,392 B2 12/2021 Salem et al.
11,212,309 B1 12/2021 Weingarten et al.
11,245,714 B2 2/2022 Weingarten et al.
11,245,715 B2 2/2022 Weingarten et al.
11,290,478 B2 3/2022 Weingarten et al.
11,310,262 B1 4/2022 Oliphant et al.
11,316,879 B2 4/2022 Ott et al.
11,330,005 B2 5/2022 Beauchesne et al.
11,363,031 B2 6/2022 Carnes et al.
11,379,607 B2 7/2022 Swafford
11,470,115 B2 10/2022 Vissamsetty et al.
11,481,503 B2 10/2022 Gitelman et al.
11,507,663 B2 11/2022 Cohen et al.
11,522,894 B2 12/2022 Weingarten et al.
11,539,722 B2 12/2022 Singh et al.
11,579,857 B2 2/2023 Montag et al.
11,580,218 B2 2/2023 Salem et al.
11,615,184 B2 3/2023 Kutt et al.
11,616,812 B2 3/2023 Vissamsetty et al.
11,625,485 B2 4/2023 Weingarten et al.
11,695,800 B2 7/2023 Vissamsetty et al.
11,716,341 B2 8/2023 Weingarten et al.
11,716,342 B2 8/2023 Weingarten et al.
11,722,506 B2 8/2023 Weingarten et al.
11,734,303 B2 8/2023 Cruanes et al.
11,741,220 B2 8/2023 Yu et al.
11,748,083 B2 9/2023 Montag et al.
11,790,079 B2 10/2023 Salem et al.
11,838,305 B2 12/2023 Weingarten et al.
11,838,306 B2 12/2023 Weingarten et al.
11,876,819 B2 1/2024 Weingarten et al.
11,886,591 B2 1/2024 Cohen et al.
11,888,897 B2 1/2024 Vissamsetty et al.
11,899,782 B1 2/2024 Gupta et al.
11,973,781 B2 4/2024 Weingarten et al.
11,997,139 B2 5/2024 Vissamsetty et al.
12,026,257 B2 7/2024 Weingarten et al.
12,169,556 B2 12/2024 Salem et al.
12,177,241 B2 12/2024 Weingarten et al.
12,189,623 B2 1/2025 Newman
12,206,698 B2 1/2025 Weingarten et al.
12,235,962 B2 2/2025 Cohen et al.
12,244,626 B2 3/2025 Weingarten et al.
12,259,967 B2 3/2025 Gupta et al.
12,261,884 B2 3/2025 Vissamsetty et al.
12,341,814 B2 6/2025 Vissamsetty et al.
12,363,151 B2 7/2025 Weingarten et al.
12,418,565 B2 9/2025 Vissamsetty et al.
12,423,078 B2 9/2025 Montag et al.
12,432,253 B2 9/2025 Vissamsetty et al.
12,450,351 B2 10/2025 Weingarten et al.
12,452,273 B2 10/2025 Ramchetty et al.
12,468,810 B2 11/2025 Kotler et al.
12,579,268 B2 3/2026 Ludmir et al.
2002/0010800 A1 1/2002 Riley et al.
2002/0016826 A1 2/2002 Johansson et al.
2002/0078382 A1 6/2002 Sheikh et al.
2002/0093917 A1 7/2002 Knobbe et al.
2002/0095607 A1 7/2002 Lin-Hendel
2002/0178374 A1 11/2002 Swimmer et al.
2002/0194489 A1 12/2002 Almogy et al.
2003/0065950 A1 4/2003 Yarborough
2003/0126464 A1 7/2003 McDaniel et al.
2003/0145225 A1 7/2003 Bruton et al.
2003/0145226 A1 7/2003 Bruton et al.
2003/0152034 A1 8/2003 Zhang et al.
2003/0188189 A1 10/2003 Desai et al.
2003/0223367 A1 12/2003 Shay et al.
2004/0083369 A1 4/2004 Erlingsson et al.
2004/0172557 A1 9/2004 Nakae et al.
2004/0243699 A1 12/2004 Koclanes et al.
2004/0255157 A1 12/2004 Ghanea-Hercock
2005/0050353 A1 3/2005 Thiele et al.
2005/0076235 A1 4/2005 Ormazabal et al.
2005/0076238 A1 4/2005 Ormazabal et al.
2005/0108562 A1 5/2005 Khazan et al.
2005/0138402 A1 6/2005 Yoon et al.
2005/0160480 A1 7/2005 Birt et al.
2005/0193173 A1 9/2005 Ring et al.
2005/0198507 A1 9/2005 Brender et al.
2005/0204157 A1 9/2005 Johnson
2005/0223239 A1 10/2005 Dotan
2005/0240906 A1 10/2005 Kinderknecht et al.
2005/0240989 A1 10/2005 Kim et al.
2005/0288939 A1 12/2005 Peled et al.
2006/0036641 A1 2/2006 Brydon et al.
2006/0053490 A1 3/2006 Herz et al.
2006/0085543 A1 4/2006 Hrastar et al.
2006/0101515 A1 5/2006 Amoroso et al.
2006/0126522 A1 6/2006 Oh
2006/0161989 A1 7/2006 Reshef et al.
2006/0179296 A1 8/2006 Bartlett et al.
2006/0203774 A1 9/2006 Carrion-Rodrigo
2006/0209701 A1 9/2006 Zhang et al.
2006/0230129 A1 10/2006 Swami et al.
2006/0236401 A1 10/2006 Fosdick
2006/0253624 A1* 11/2006 Revah ................ G06F 11/2058 710/52
2007/0016945 A1 1/2007 Bassett et al.
2007/0022090 A1 1/2007 Graham
2007/0025374 A1 2/2007 Stefan et al.
2007/0067623 A1 3/2007 Ward
2007/0097976 A1 5/2007 Wood et al.
2007/0100905 A1 5/2007 Masters et al.
2007/0101431 A1 5/2007 Clift et al.
2007/0115993 A1 5/2007 Cohen
2007/0143827 A1 6/2007 Nicodemus et al.
2007/0143851 A1 6/2007 Nicodemus et al.
2007/0177499 A1 8/2007 Gavrilescu et al.

(56) References Cited

U.S. PATENT DOCUMENTS

2007/0192500 A1 8/2007 Lum
2007/0208822 A1 9/2007 Wang et al.
2007/0208936 A1 9/2007 Ramos Robles
2007/0209070 A1 9/2007 Yadav
2007/0226320 A1 9/2007 Hager et al.
2007/0240215 A1 10/2007 Flores et al.
2007/0250930 A1 10/2007 Aziz et al.
2007/0266422 A1 11/2007 Germano et al.
2007/0282782 A1 12/2007 Carey et al.
2008/0005782 A1 1/2008 Aziz
2008/0018927 A1 1/2008 Martin et al.
2008/0022000 A1 1/2008 Furuya et al.
2008/0034429 A1 2/2008 Schneider
2008/0046989 A1 2/2008 Wahl
2008/0060074 A1 3/2008 Okuyama
2008/0071728 A1 3/2008 Lim
2008/0082722 A1 4/2008 Savagaonkar et al.
2008/0083034 A1 4/2008 Kim et al.
2008/0098476 A1 4/2008 Syversen
2008/0104046 A1 5/2008 Singla et al.
2008/0127346 A1 5/2008 Oh et al.
2008/0148381 A1 6/2008 Aaron
2008/0162397 A1 7/2008 Zaltzman
2008/0168559 A1 7/2008 Touitou et al.
2008/0170566 A1 7/2008 Akimoto
2008/0229415 A1 9/2008 Kapoor et al.
2008/0244694 A1 10/2008 Neystadt et al.
2008/0267144 A1 10/2008 Jano et al.
2009/0077664 A1 3/2009 Hsu et al.
2009/0089040 A1 4/2009 Monastyrsky et al.
2009/0104046 A1 4/2009 Martin et al.
2009/0158407 A1 6/2009 Nicodemus et al.
2009/0158418 A1 6/2009 Rao et al.
2009/0170566 A1 7/2009 Kwon et al.
2009/0199296 A1 8/2009 Xie et al.
2009/0241173 A1 9/2009 Troyansky
2009/0249466 A1 10/2009 Motil et al.
2009/0249470 A1 10/2009 Litvin et al.
2009/0254973 A1 10/2009 Kwan
2009/0288158 A1 11/2009 Izatt et al.
2009/0296641 A1 12/2009 Bienas et al.
2009/0327688 A1 12/2009 Li et al.
2009/0328196 A1 12/2009 Bovee
2010/0005339 A1 1/2010 Hooks
2010/0077483 A1 3/2010 Stolfo et al.
2010/0122317 A1 5/2010 Yadav
2010/0122343 A1 5/2010 Ghosh et al.
2010/0169973 A1 7/2010 Kim et al.
2010/0229239 A1 9/2010 Rozenberg et al.
2010/0269175 A1 10/2010 Stolfo et al.
2010/0293615 A1 11/2010 Ye
2010/0299430 A1 11/2010 Powers et al.
2010/0332498 A1 12/2010 Svore et al.
2010/0333177 A1 12/2010 Donley et al.
2011/0023118 A1 1/2011 Wright
2011/0067107 A1 3/2011 Weeks et al.
2011/0078309 A1 3/2011 Bloch et al.
2011/0099633 A1 4/2011 Aziz
2011/0113427 A1 5/2011 Dotan
2011/0138456 A1 6/2011 Ormazabal et al.
2011/0141937 A1 6/2011 Breslin et al.
2011/0145920 A1 6/2011 Mahaffey et al.
2011/0167494 A1 7/2011 Bowen et al.
2011/0178930 A1 7/2011 Scheidt et al.
2011/0185430 A1 7/2011 Sallam
2011/0191853 A1 8/2011 Atcha
2011/0209219 A1 8/2011 Zeitlin et al.
2011/0214176 A1 9/2011 Burch et al.
2011/0214182 A1 9/2011 Adams et al.
2011/0219443 A1 9/2011 Hampel et al.
2011/0219449 A1 9/2011 St. Neitzel et al.
2011/0225655 A1 9/2011 Niemeläet al.
2011/0247071 A1 10/2011 Hooks et al.
2011/0252434 A1 10/2011 Stokes
2011/0271341 A1 11/2011 Satish et al.
2011/0276597 A1 11/2011 Little
2011/0277035 A1 11/2011 Singh et al.
2011/0288940 A1 11/2011 Horadan et al.
2012/0023572 A1 1/2012 Williams et al.
2012/0030745 A1 2/2012 Bauer
2012/0030750 A1 2/2012 Bhargava et al.
2012/0079596 A1 3/2012 Thomas et al.
2012/0084866 A1 4/2012 Stolfo
2012/0096516 A1 4/2012 Sobel et al.
2012/0106377 A1 5/2012 Sommers et al.
2012/0124363 A1 5/2012 Dietrich et al.
2012/0137342 A1 5/2012 Hartrell et al.
2012/0137367 A1 5/2012 Dupont et al.
2012/0144488 A1 6/2012 Sankruthi
2012/0151565 A1 6/2012 Fiterman
2012/0185563 A1 7/2012 Sugiyama et al.
2012/0240182 A1 9/2012 Narayanaswamy et al.
2012/0240183 A1 9/2012 Sinha
2012/0254995 A1 10/2012 Sallam
2012/0255003 A1 10/2012 Sallam
2012/0255004 A1 10/2012 Sallam
2012/0255012 A1 10/2012 Sallam
2012/0255031 A1 10/2012 Sallam
2012/0291090 A1 11/2012 Srinivasan et al.
2012/0297486 A1 11/2012 Turbin
2012/0297488 A1 11/2012 Kapoor et al.
2012/0324094 A1 12/2012 Wyatt et al.
2012/0331553 A1 12/2012 Aziz et al.
2013/0052992 A1 2/2013 Lee et al.
2013/0054682 A1 2/2013 Malik et al.
2013/0061097 A1 3/2013 Mendel et al.
2013/0080641 A1 3/2013 Lui et al.
2013/0086684 A1 4/2013 Mohler
2013/0091573 A1 4/2013 Herz et al.
2013/0097706 A1 4/2013 Titonis et al.
2013/0111547 A1 5/2013 Kraemer
2013/0133072 A1 5/2013 Kraitsman et al.
2013/0152200 A1 6/2013 Alme et al.
2013/0167236 A1 6/2013 Sick
2013/0191924 A1 7/2013 Tedesco et al.
2013/0198842 A1 8/2013 Klein et al.
2013/0212658 A1 8/2013 Amaya et al.
2013/0219217 A1 8/2013 Seren et al.
2013/0231084 A1 9/2013 Raleigh
2013/0239192 A1 9/2013 Linga et al.
2013/0242743 A1 9/2013 Thomas et al.
2013/0246685 A1 9/2013 Bhargava et al.
2013/0247190 A1 9/2013 Spurlock
2013/0290662 A1 10/2013 Teal
2013/0290729 A1 10/2013 Pettigrew et al.
2013/0291111 A1 10/2013 Zhou et al.
2013/0298192 A1 11/2013 Kumar et al.
2013/0298244 A1 11/2013 Kumar et al.
2013/0305377 A1 11/2013 Herz
2013/0329732 A1 12/2013 Vyas et al.
2013/0333040 A1 12/2013 Diehl et al.
2013/0340033 A1 12/2013 Jones et al.
2013/0346472 A1 12/2013 Wheeldon
2013/0347052 A1 12/2013 Choudrie
2014/0020046 A1 1/2014 Heitzman
2014/0046645 A1 2/2014 White et al.
2014/0053267 A1 2/2014 Klein et al.
2014/0059525 A1 2/2014 Jawa et al.
2014/0068326 A1 3/2014 Quinn
2014/0068779 A1 3/2014 Tan et al.
2014/0090061 A1 3/2014 Avasarala et al.
2014/0096229 A1 4/2014 Burns et al.
2014/0108794 A1 4/2014 Barton et al.
2014/0114609 A1 4/2014 Maurer et al.
2014/0123280 A1 5/2014 Kedma et al.
2014/0137246 A1 5/2014 Baluda et al.
2014/0150094 A1 5/2014 Rao et al.
2014/0157366 A1 6/2014 Ko et al.
2014/0165203 A1 6/2014 Friedrichs et al.
2014/0196108 A1 7/2014 Barr et al.
2014/0215617 A1 7/2014 Smith et al.
2014/0215621 A1 7/2014 Xaypanya et al.
2014/0215625 A1 7/2014 Paul et al.
2014/0237562 A1 8/2014 Nandakumar

(56) References Cited

U.S. PATENT DOCUMENTS

2014/0237595 A1 8/2014 Sridhara et al.
2014/0237599 A1 8/2014 Gertner et al.
2014/0245376 A1 8/2014 Hibbert et al.
2014/0250524 A1 9/2014 Meyers et al.
2014/0258990 A1 9/2014 Klic et al.
2014/0259092 A1 9/2014 Boucher et al.
2014/0270157 A1 9/2014 Youd et al.
2014/0280864 A1 9/2014 Yin et al.
2014/0282816 A1 9/2014 Xie et al.
2014/0283038 A1 9/2014 Call et al.
2014/0283076 A1 9/2014 Muttik
2014/0289851 A1 9/2014 Klein et al.
2014/0298419 A1 10/2014 Boubez et al.
2014/0349611 A1 11/2014 Kant et al.
2014/0372600 A1 12/2014 Archer et al.
2014/0373091 A1 12/2014 Kirner et al.
2014/0373158 A1 12/2014 Hay et al.
2015/0006384 A1 1/2015 Shaikh
2015/0007312 A1 1/2015 Pidathala et al.
2015/0013006 A1 1/2015 Shulman et al.
2015/0013008 A1 1/2015 Lukacs et al.
2015/0033341 A1 1/2015 Schmidtler et al.
2015/0039513 A1 2/2015 Adjaoute
2015/0052607 A1 2/2015 Al Hamami
2015/0067763 A1 3/2015 Dalcher et al.
2015/0074744 A1 3/2015 McLean et al.
2015/0074810 A1 3/2015 Saher et al.
2015/0082430 A1 3/2015 Sridhara et al.
2015/0089655 A1 3/2015 Choi et al.
2015/0096048 A1 4/2015 Zhang et al.
2015/0113616 A1 4/2015 Sampas
2015/0121524 A1 4/2015 Fawaz et al.
2015/0121529 A1 4/2015 Quinlan et al.
2015/0128206 A1 5/2015 Ben et al.
2015/0128246 A1 5/2015 Feghali et al.
2015/0143496 A1 5/2015 Thomas et al.
2015/0150125 A1 5/2015 Dulkin et al.
2015/0150130 A1 5/2015 Fiala et al.
2015/0156214 A1 6/2015 Kaminsky
2015/0161024 A1 6/2015 Gupta et al.
2015/0161386 A1 6/2015 Gupta et al.
2015/0163121 A1 6/2015 Mahaffey et al.
2015/0172300 A1 6/2015 Cochenour
2015/0195291 A1 7/2015 Zuk et al.
2015/0199512 A1 7/2015 Kim et al.
2015/0200928 A1 7/2015 Burch et al.
2015/0200955 A1 7/2015 Martin
2015/0205962 A1 7/2015 Swidowski et al.
2015/0207813 A1 7/2015 Reybok et al.
2015/0220735 A1 8/2015 Paithane et al.
2015/0244733 A1 8/2015 Mohaisen et al.
2015/0254161 A1 9/2015 Baril et al.
2015/0257194 A1 9/2015 Cho
2015/0264068 A1 9/2015 Beauchesne
2015/0264077 A1 9/2015 Berger et al.
2015/0268947 A1 9/2015 Ionescu
2015/0268989 A1 9/2015 Busch et al.
2015/0271200 A1 9/2015 Brady et al.
2015/0281267 A1 10/2015 Danahy et al.
2015/0286820 A1 10/2015 Sridhara et al.
2015/0288706 A1 10/2015 Marshall
2015/0310196 A1 10/2015 Turgeman et al.
2015/0326587 A1 11/2015 Vissamsetty et al.
2015/0326588 A1 11/2015 Vissamsetty et al.
2015/0326592 A1 11/2015 Vissamsetty et al.
2015/0326599 A1 11/2015 Vissamsetty et al.
2015/0332043 A1 11/2015 Russello
2015/0346066 A1 12/2015 Dutta et al.
2015/0350213 A1 12/2015 Varadarajan et al.
2015/0350236 A1 12/2015 Klinghofer et al.
2015/0356313 A1* 12/2015 Kane .................... G06F 21/604 726/28
2015/0358345 A1 12/2015 Clark et al.
2015/0370560 A1 12/2015 Tan et al.
2015/0373039 A1 12/2015 Wang
2015/0379371 A1 12/2015 Yoon et al.
2015/0381376 A1 12/2015 Wardman et al.
2016/0028750 A1 1/2016 Di et al.
2016/0042179 A1 2/2016 Weingarten et al.
2016/0042180 A1 2/2016 Sayre et al.
2016/0050182 A1 2/2016 Edross
2016/0055334 A1 2/2016 Herwono et al.
2016/0055337 A1 2/2016 El-Moussa
2016/0065675 A1 3/2016 Brand
2016/0072838 A1 3/2016 Kolton et al.
2016/0078365 A1 3/2016 Baumard
2016/0080414 A1 3/2016 Kolton et al.
2016/0127352 A1 5/2016 Xu et al.
2016/0127413 A1 5/2016 Kraitsman et al.
2016/0142399 A1 5/2016 Pace et al.
2016/0191554 A1 6/2016 Kaminsky
2016/0212225 A1 7/2016 Smith et al.
2016/0261631 A1 9/2016 Vissamsetty et al.
2016/0285914 A1 9/2016 Singh et al.
2016/0315909 A1 10/2016 Von et al.
2016/0323300 A1 11/2016 Boss et al.
2016/0323316 A1 11/2016 Kolton et al.
2016/0335110 A1 11/2016 Paithane et al.
2016/0337390 A1 11/2016 Sridhara et al.
2016/0359915 A1 12/2016 Gupta et al.
2016/0381023 A1 12/2016 Dulce et al.
2017/0009391 A1 1/2017 Fu et al.
2017/0010968 A1 1/2017 Li et al.
2017/0017672 A1 1/2017 Fan et al.
2017/0019425 A1 1/2017 Ettema et al.
2017/0026387 A1 1/2017 Vissamsetty et al.
2017/0032120 A1 2/2017 Tolpin et al.
2017/0032122 A1 2/2017 Thakar et al.
2017/0039367 A1 2/2017 Ionescu et al.
2017/0054754 A1 2/2017 Saher et al.
2017/0093910 A1 3/2017 Gukal et al.
2017/0126718 A1 5/2017 Baradaran et al.
2017/0134405 A1 5/2017 Ahmadzadeh et al.
2017/0141980 A1 5/2017 Palanciuc et al.
2017/0142068 A1 5/2017 Devarajan et al.
2017/0147796 A1 5/2017 Sardesai et al.
2017/0149787 A1 5/2017 Niemela et al.
2017/0149795 A1 5/2017 Day, II
2017/0149832 A1 5/2017 Touboul et al.
2017/0171244 A1 6/2017 Vissamsetty et al.
2017/0180345 A1 6/2017 Mohan
2017/0180421 A1 6/2017 Shieh et al.
2017/0201545 A1 7/2017 Nicodemus et al.
2017/0206142 A1 7/2017 Pawar et al.
2017/0206357 A1 7/2017 Gorelik et al.
2017/0230384 A1 8/2017 Touboul et al.
2017/0230402 A1 8/2017 Greenspan et al.
2017/0235967 A1 8/2017 Ray et al.
2017/0244729 A1 8/2017 Fahrny et al.
2017/0244749 A1 8/2017 Shulman et al.
2017/0244755 A1 8/2017 Tsao et al.
2017/0250855 A1 8/2017 Patil et al.
2017/0257375 A1 9/2017 Dulkin et al.
2017/0264639 A1 9/2017 Sama et al.
2017/0279839 A1 9/2017 Vasseur et al.
2017/0279846 A1 9/2017 Osterweil et al.
2017/0286676 A1 10/2017 Weingarten et al.
2017/0302458 A1 10/2017 Berger et al.
2017/0302653 A1 10/2017 Ortner et al.
2017/0302665 A1 10/2017 Zou et al.
2017/0302696 A1 10/2017 Schutz et al.
2017/0310692 A1 10/2017 Ackerman et al.
2017/0318054 A1 11/2017 Vissamsetty et al.
2017/0322959 A1 11/2017 Tidwell et al.
2017/0324774 A1 11/2017 Ohayon et al.
2017/0324777 A1 11/2017 Ohayon et al.
2017/0331849 A1 11/2017 Yu et al.
2017/0331856 A1 11/2017 Vissamsetty et al.
2017/0346802 A1 11/2017 Gruskin et al.
2017/0346853 A1 11/2017 Wyatt et al.
2017/0359370 A1 12/2017 Humphries et al.
2018/0013788 A1 1/2018 Vissamsetty et al.
2018/0020005 A1 1/2018 Beiter et al.
2018/0027006 A1 1/2018 Zimmermann et al.

(56) References Cited

U.S. PATENT DOCUMENTS

2018/0027009 A1 1/2018 Santos et al.
2018/0027017 A1 1/2018 Touboul et al.
2018/0039776 A1 2/2018 Loman et al.
2018/0048665 A1 2/2018 Shulman et al.
2018/0063187 A1 3/2018 St Pierre
2018/0089430 A1 3/2018 Mayo
2018/0089431 A1 3/2018 Nalluri et al.
2018/0091553 A1 3/2018 Mandyam et al.
2018/0124096 A1 5/2018 Schwartz et al.
2018/0143915 A1 5/2018 Gonzalez et al.
2018/0145886 A1 5/2018 Rao
2018/0146008 A1 5/2018 Vissamsetty et al.
2018/0173876 A1 6/2018 Vissamsetty et al.
2018/0181763 A1 6/2018 Gunda
2018/0183815 A1 6/2018 Enfinger
2018/0191593 A1 7/2018 De Knijf et al.
2018/0212999 A1 7/2018 Kassimis et al.
2018/0225592 A1 8/2018 Ponnuswamy
2018/0234459 A1 8/2018 Kung et al.
2018/0248896 A1 8/2018 Challita et al.
2018/0276146 A1 9/2018 Dover
2018/0278505 A1 9/2018 Sarin
2018/0331886 A1* 11/2018 Schroeder ............... H04L 69/40
2018/0343281 A1 11/2018 Ahuja et al.
2018/0359272 A1 12/2018 Mizrachi et al.
2018/0359278 A1 12/2018 Rusakov et al.
2018/0365412 A1 12/2018 Israel et al.
2019/0042745 A1 2/2019 Chen et al.
2019/0052659 A1* 2/2019 Weingarten ........... H04L 63/104
2019/0068642 A1 2/2019 Araujo et al.
2019/0073475 A1 3/2019 Gupta et al.
2019/0089677 A1 3/2019 Ashley et al.
2019/0114426 A1 4/2019 Cohen et al.
2019/0138639 A1 5/2019 Pal et al.
2019/0138725 A1 5/2019 Gupta
2019/0188212 A1 6/2019 Miller et al.
2019/0199736 A1 6/2019 Howard et al.
2019/0230078 A1 7/2019 Han
2019/0235778 A1 8/2019 Jin et al.
2019/0253453 A1 8/2019 Vissamsetty et al.
2019/0258807 A1 8/2019 DiMaggio et al.
2019/0286722 A1 9/2019 Barov
2019/0294485 A1 9/2019 Kukreja et al.
2019/0294614 A1 9/2019 Brodt et al.
2019/0312904 A1 10/2019 Stevens et al.
2019/0318100 A1 10/2019 Bhatia et al.
2019/0327255 A1* 10/2019 Zhou ................... H04L 63/1425
2019/0340353 A1 11/2019 Mitelman
2019/0349369 A1 11/2019 Bengtson et al.
2019/0354355 A1 11/2019 Jacobson et al.
2019/0379697 A1 12/2019 Vissamsetty et al.
2019/0392260 A1 12/2019 Pang et al.
2020/0021609 A1 1/2020 Kuppanna et al.
2020/0050586 A1 2/2020 Pal et al.
2020/0051697 A1 2/2020 Krishnamurti et al.
2020/0059483 A1 2/2020 Weingarten et al.
2020/0076853 A1 3/2020 Pandian et al.
2020/0082188 A1* 3/2020 Singh ................... G08B 25/016
2020/0133865 A1 4/2020 Mannava et al.
2020/0137114 A1 4/2020 Bender et al.
2020/0137125 A1 4/2020 Patnala et al.
2020/0143054 A1 5/2020 Cohen et al.
2020/0143061 A1 5/2020 Kim et al.
2020/0159841 A1 5/2020 Tabares et al.
2020/0201620 A1 6/2020 Beard
2020/0218806 A1 7/2020 Cho
2020/0244677 A1 7/2020 Abbaszadeh et al.
2020/0252429 A1 8/2020 Vissamsetty et al.
2020/0274894 A1 8/2020 Argoeti et al.
2020/0311271 A1 10/2020 Weingarten et al.
2020/0351245 A1 11/2020 Moore et al.
2020/0366686 A1 11/2020 Gal et al.
2020/0372150 A1 11/2020 Salem et al.
2020/0374087 A1 11/2020 Vissamsetty et al.
2020/0389432 A1 12/2020 Panchalingam et al.
2021/0021572 A1 1/2021 Bonczar
2021/0026950 A1 1/2021 Ionescu
2021/0029153 A1 1/2021 Sugimoto et al.
2021/0037046 A1 2/2021 Dhillon
2021/0044623 A1 2/2021 Bosch et al.
2021/0049171 A1 2/2021 Ziauddin et al.
2021/0073374 A1 3/2021 Mookken et al.
2021/0073658 A1 3/2021 Poole et al.
2021/0081451 A1 3/2021 Wong et al.
2021/0105285 A1 4/2021 Simakov et al.
2021/0105613 A1 4/2021 San et al.
2021/0117232 A1 4/2021 Sriharsha et al.
2021/0149777 A1 5/2021 Gao et al.
2021/0152586 A1 5/2021 Weingarten et al.
2021/0185538 A1 6/2021 Zhang et al.
2021/0203699 A1 7/2021 Schmugar
2021/0232291 A1 7/2021 Abdulaal et al.
2021/0263945 A1 8/2021 Siebel et al.
2021/0297447 A1 9/2021 Crabtree et al.
2021/0303533 A1 9/2021 Legler
2021/0335025 A1 10/2021 Chen et al.
2021/0397696 A1 12/2021 Yarabolu
2021/0397710 A1 12/2021 Cohen et al.
2022/0006826 A1 1/2022 Weingarten et al.
2022/0006827 A1 1/2022 Weingarten et al.
2022/0014535 A1 1/2022 Weingarten et al.
2022/0014539 A1 1/2022 Weingarten et al.
2022/0019659 A1 1/2022 Salem et al.
2022/0050895 A1 2/2022 Yu et al.
2022/0070256 A1 3/2022 Singh et al.
2022/0086142 A1 3/2022 Hecht
2022/0101096 A1 3/2022 Singer et al.
2022/0164444 A1 5/2022 Prudkovskij
2022/0188087 A1 6/2022 Montag et al.
2022/0210200 A1 6/2022 Crabtree et al.
2022/0232032 A1 7/2022 Mo et al.
2022/0253526 A1 8/2022 Sanders
2022/0292067 A1 9/2022 Zhang et al.
2022/0391496 A9 12/2022 Salem et al.
2022/0414676 A1 12/2022 Power et al.
2023/0007025 A1 1/2023 Weingarten et al.
2023/0007026 A1 1/2023 Weingarten et al.
2023/0007027 A1 1/2023 Weingarten et al.
2023/0007028 A1 1/2023 Weingarten et al.
2023/0007029 A1 1/2023 Weingarten et al.
2023/0007030 A1 1/2023 Weingarten et al.
2023/0007031 A1 1/2023 Weingarten et al.
2023/0053937 A1 2/2023 Choi et al.
2023/0065321 A1 3/2023 Vissamsetty et al.
2023/0090132 A1* 3/2023 Babourine ............. G06F 21/31
726/23
2023/0146847 A1 5/2023 Salem et al.
2023/0153090 A1 5/2023 Montag et al.
2023/0169117 A1 6/2023 Bedi et al.
2023/0185917 A1 6/2023 Cohen et al.
2023/0208870 A1 6/2023 Yellapragada et al.
2023/0229658 A1 7/2023 Newman
2023/0247046 A1 8/2023 Peters et al.
2023/0247048 A1 8/2023 Samosseiko et al.
2023/0281308 A1 9/2023 Maimon et al.
2023/0281311 A1 9/2023 Weingarten et al.
2023/0283635 A1 9/2023 Vissamsetty et al.
2023/0291769 A1 9/2023 Talur et al.
2023/0308460 A1 9/2023 Thomas et al.
2023/0319087 A1 10/2023 Ramchetty et al.
2023/0319089 A1 10/2023 Chesla et al.
2023/0336573 A1 10/2023 Jones
2023/0362187 A1 11/2023 Walch et al.
2023/0367871 A1 11/2023 Ko et al.
2023/0388344 A1 11/2023 Vissamsetty et al.
2024/0007503 A1 1/2024 Vissamsetty et al.
2024/0069881 A1 2/2024 Montag et al.
2024/0073232 A1 2/2024 Weingarten et al.
2024/0089273 A1 3/2024 Aslaner
2024/0106861 A1 3/2024 Ahn et al.
2024/0119153 A1 4/2024 Ludmir et al.
2024/0152618 A1 5/2024 Cohen et al.
2024/0171600 A1 5/2024 Weingarten et al.
2024/0176874 A1 5/2024 Gupta et al.

(56) References Cited

U.S. PATENT DOCUMENTS

| | | | |
|---|---|---|---|
| 2024/0184884 | A1 | 6/2024 | Salem et al. |
| 2024/0187437 | A1 | 6/2024 | Weingarten et al. |
| 2024/0205251 | A1 | 6/2024 | Weingarten et al. |
| 2024/0241956 | A1 | 7/2024 | Kotler et al. |
| 2024/0281540 | A1 | 8/2024 | Mizushima et al. |
| 2024/0356971 | A1 | 10/2024 | Vissamsetty et al. |
| 2024/0362229 | A1 | 10/2024 | Liechtenstein et al. |
| 2024/0380784 | A1 | 11/2024 | Vissamsetty et al. |
| 2025/0005155 | A1 | 1/2025 | Weingarten et al. |
| 2025/0173335 | A1 | 5/2025 | Newman |
| 2025/0181709 | A1 | 6/2025 | Salem et al. |
| 2025/0184339 | A1 | 6/2025 | Weingarten et al. |
| 2025/0225243 | A1 | 7/2025 | Cohen et al. |
| 2025/0233879 | A1 | 7/2025 | Weingarten et al. |
| 2025/0258909 | A1 | 8/2025 | Gupta et al. |
| 2025/0260721 | A1 | 8/2025 | Vissamsetty et al. |
| 2025/0267160 | A1 | 8/2025 | Weingarten et al. |
| 2026/0023845 | A1 | 1/2026 | Braun et al. |
| 2026/0086991 | A1 | 3/2026 | Hart |

FOREIGN PATENT DOCUMENTS

| | | | |
|---|---|---|---|
| CN | 113297584 | A | 8/2021 |
| CN | 113434858 | A | 9/2021 |
| CN | 115473857 | A | 12/2022 |
| CN | 118445301 | A | 8/2024 |
| EP | 3171568 | A1 | 5/2017 |
| EP | 3472746 | A1 | 4/2019 |
| EP | 3806420 | A1 | 4/2021 |
| EP | 3968197 | A1 | 3/2022 |
| EP | 3979096 | A1 | 4/2022 |
| ES | 2785350 | T3 | 10/2020 |
| JP | 2006-106939 | A | 4/2006 |
| JP | 2008-252625 | A | 10/2008 |
| JP | 2013-168141 | A | 8/2013 |
| JP | 2015-534690 | A | 12/2015 |
| JP | 2016-512631 | A | 4/2016 |
| JP | 2017-504102 | A | 2/2017 |
| KR | 10-2015-0101811 | A | 9/2015 |
| KR | 10-1969572 | B1 | 4/2019 |
| KR | 10-2021-0079494 | A | 6/2021 |
| WO | 02/27440 | A2 | 4/2002 |
| WO | 2010/030169 | A2 | 3/2010 |
| WO | 2012/027669 | A1 | 3/2012 |
| WO | 2013/014672 | | 1/2013 |
| WO | 2013/121951 | A1 | 8/2013 |
| WO | 2014/126779 | A1 | 8/2014 |
| WO | 2015/171780 | A1 | 11/2015 |
| WO | 2015/171789 | A1 | 11/2015 |
| WO | 2016/024268 | A1 | 2/2016 |
| WO | 2016/081561 | A1 | 5/2016 |
| WO | 2017/064710 | A1 | 4/2017 |
| WO | 2017/068889 | A1 | 4/2017 |
| WO | 2017/218872 | A1 | 12/2017 |
| WO | 2019/032728 | A1 | 2/2019 |
| WO | 2019/092530 | A1 | 5/2019 |
| WO | 2019/245107 | A1 | 12/2019 |
| WO | 2020/108357 | A1 | 6/2020 |
| WO | 2022/046365 | A1 | 3/2022 |
| WO | 2022/076234 | A1 | 4/2022 |

OTHER PUBLICATIONS

IBM Security Guardium Insights for IBM Cloud Park for Security, printed from https://www.ibm.com/downloads/cas/QY1RYRLP, printed May 26, 2021 in 12 pages.

"IBM Security Qradar SIEM Installation Guide" downloaded from http://www.siem.su/docs/ibm/Installation_andupdating/IBM_SecurityQRadar installation_Guide.pdf, printed 2013, vol. 7.2 in 54 pages.

"IBM Security Trusteer Apex Advanced malware Protection (SaaS) delivers an enterprise endpoint security solution to help protect organizations from advanced malware and targeted attacks" downloaded from https://www-01.ibm.com/common/ssi/rep_ca/0/877/ENUSZP14-0390/ENUSZP14-0390.PDF, printed Aug. 5, 2014, in 9 pgs.

Abdelhameed, M.U, et al. Portable executable automatic protection using dynamic infection and code redirection; 2009 International Conference on Computer Engineering & Systems (pp. 501-507); (Year: 2009).

Abrath, Bert et al. Obfuscating Windows DLLs; 2015 IEEE/ACM 1st International Workshop on Software Protection (pp. 24-30); (Year: 2015).

Barbhuiya et al., "Detection of neighbor solicitation and advertisement spoofing in IPV6 neighbor discovery protocol." Proceedings of the 4th international conference on Security of information and networks. (2011).

Birrer, B, et al., "Using qualia and hierarchical models in malware detection", Journal of Information Assurance and Security, Dec. 29, 2009, pp. 247-255.

Chakraborty et al., "Hierarchical learning for automated malware classification", MILCOM 2017-2017 IEEE Military Communications Conference (MILCOM), Oct. 23-25, 2017, pp. 1-6.

Chen et al., "MitM attack by name collision: Cause analysis and vulnerability assessment in the new gTLD era." Security and Privacy (SP), 2016 IEEE Symposium on. IEEE (2016).

Dini et al., "Probabilistic Contract Compliance for Mobile Applications", Eighth International Conference on Availability, Reliability and Security (ARES) IEEE, Sep. 2-6, 2013, pp. 599-606.

Gu et al., "Malicious Shellcode Detection with Virtual Memory Snapshots," 2010 Proceedings IEEE INFOCOM, San Diego, CA, 2010, pp. 1-9, accessed Mar. 6, 2019.

IBM Guardium Documentation "Components and Topology", downloaded from https://www.ibm.com/docs/en/qsip/7.4?topic=deployment-qradar-architecture-overview, printed on Jun. 8, 2021, in 3 pages.

IBM Security Qradar Solution Brief "Visibility, detection, investigation and response" printed from https://www.ibm.com/downloads/cas/OP62GKAR, printed on May 26, 2021, in 11 pgs.

IBM Software, "Stepping up the battle against advanced threats", IBM Trusteer Apex Thought Leadership White Paper, Dec. 2013, WGW03043-USEN-OO.

IBM, "Qradar Architecture overview", downloaded from https://www.ibm.com/docs/en/qsip/7.4?topic=deployment-qradar-architecture-overview printed May 28, 2021, in 6 DQS.

Installing a Tanium Client—distributed also using user/password (not encrypted) from a hosted Module server, downloaded from https://docs.tanium.com/client/client/deployment.html#client_management on Apr. 2021.

Jack Ullrich, Detecting Manual Syscalls from User Mode, Winternl, Cybersecurity Research & Development, Feb. 10, 2021, 11 pages, https://winternl.com/detecting-manual-syscalls-from-user-mode/.

Laureano et al., M., "Intrusion detection in virtual machine environments. In Euromicro Conference, 2004. Proceedings." 30th (pp. 520-525). IEEE Sep. 30, 2004.

Liu et al., "Detecting Trojan Horses Based on System Behavior Using Machine Learning Method", International Conference on Machine Learning and Cybernetics (ICMLC), IEEE, Jul. 11-14, 2010, 02:S. 855-860.

Mahler, "A New Methodology for Information Security Risk Assessment for Medical Devices and Its Evaluation," 2020, The Department of Software and Information Systems Engineering, Ben-Gurion University of the Negev, Israel.

Matsuda, Wataru et al. "Real-Time Detection System Against Malicious Tools by Monitoring DLL on Client Computers;" 2019 IEEE Conference on Application, Information and Network Security (AINS) (pp. 36-41); (Year: 2019).

Moussaileb et al., "Ransomware's Early Mitigation Mechanisms," Proceedings ARES 2018 Proceedings of the 13th International Conference on Availability, Reliability and Security Article No. 2, 02:S 1-10 (2018).

Nisslmueller, U., "LOLBin detection through unsupervised learning an approach based on explicit featurization of the command line and parent-child relationships", University of Twente, Student Theses, Sep. 27, 2022, 72 pages.

Ornaghi et al., "Man in the middle attacks." Blackhat Conference Europe (2003).

(56) References Cited

OTHER PUBLICATIONS

Pandian, "Security Challenges of IoT and Medical Devices in Healthcare," Internet of Things, 1st Edition, 2020, Chapter 6, pp. 87-106.
Ramachandran et al., "Detecting ARP spoofing: An active technique." International Conference on Information Systems Security, Springer, Berlin, Heidelberg (2005).
Reaqta Hive, A.I. Based Endpoint Threat Response, Whitepaper, 27 pages (Apr. 6, 2017).
Schollmeier, "A Definition of Peer-to-Peer Networking for the Classification of Peer-to-Peer Architectures and Applications," Proceedings of the First International Conference on Peer-to-Peer Computing, IEEE (2002).
Shosha et al., A.F., "Evasion-resistant malware signature based on profiling kernel data structure objects." In 2012 7th International Conference on Risks and Security ofInternet and Systems (CRISIS) (pp. 1-8). IEEE., Oct. 31, 2012.
Shun-Wen Hsiao et al., "Sequence Feature Extraction for Malware Family Analysis via Graph Neural," Network, arXiv:2208.05476vl, Aug. 10, 2022, pp. 1-12.
Stine, "A cyber risk scoring system for medical devices," International Journal of Critical Infrastructure Protection, Dec. 2017, vol. 19, pp. 32-46.
Tanium™ Client Management 1.6 User Guide, downloaded from https://docs.tanium.com/client_management/client_management/index.html on Apr. 1, 2021.
Ullrich et al., "IPv6 Security: Attacks and Countermeasures in a Nutshell." 8th USENIX Workshop on Offensive Technologies (2015).
Xu et al., "Polymorphic Malicious Executable Scanner by API Sequence Analysis", Fourth International Conference on Hybrid Intelligent Systems, IEEE Dec. 5-8, 2004, pp. 378-383.
Zaldivar, "Investigating the Security Threats on Networked Medical Devices," 2020, 10th Annual Computing and Communication Workshop and Conference, Jan. 2020.
Bert Abrath—Bart Coppens—Stijn Volckaert—Bjorn De Sutter, Obfuscating Windows DLLs, 2015 IEEE/ACM 1st International Workshop on Software Protection (2015, pp. 24-30), (Year 2015).
File history and references cited therein for U.S. Appl. No. 15/383,522, filed Dec. 19, 2016, issued Mar. 24, 2020 as U.S. Pat. No. 10,599,842 B2.
File history and references cited therein for U.S. Appl. No. 16/543,189, filed Aug. 16, 2019, issued Mar. 28, 2023 as U.S. Pat. No. 11,616,812 B2.
File history and references cited therein for U.S. Appl. No. 16/849,813, filed Apr. 15, 2020, issued Jul. 4, 2023 as U.S. Pat. No. 11,695,800 B2.
File history and references cited therein for U.S. Appl. No. 18/183,022, filed Mar. 13, 2023, issued May 28, 2024 as U.S. Pat. No. 11,997,139 B2.
File history and references cited therein for U.S. Appl. No. 18/637,358, filed Apr. 16, 2024, published Oct. 24, 2024 as U.S. Publication No. 20240356971 A1.
File History and references cited therein of corresponding U.S. Appl. No. 17/471,822, filed Sep. 10, 2021, issued Feb. 14, 2023 as U.S. Pat. No. 11,579,857 B2.
File History and references cited therein of corresponding U.S. Appl. No. 18/093,737, filed Jan. 5, 2023, issued Sep. 5, 2023 as U.S. Pat. No. 11,748,083 B2.
File History and references cited therein of corresponding U.S. Appl. No. 18/353,047, filed Jul. 14, 2023, published Feb. 29, 2024 as U.S. Publication No. 2024-0069881 A1.
File History and the references cited therein of corresponding U.S. Appl. No. 14/456,127, filed Aug. 11, 2014, issued Jul. 18, 2017 as U.S. Pat. No. 9,710,648 B2.
File History and the references cited therein of corresponding U.S. Appl. No. 15/623,669, filed Jun. 15, 2017, issued May 26, 2020 as U.S. Pat. No. 10,664,596 B2.
File History and the references cited therein of corresponding U.S. Appl. No. 15/766,339, filed Apr. 5, 2018, issued Oct. 16, 2018 as U.S. Pat. No. 10,102,374 B1.
File History and the references cited therein of corresponding U.S. Appl. No. 16/132,240, filed Sep. 14, 2018, issued Sep. 17, 2019 as U.S. Pat. No. 10,417,424 B2.
File History and the references cited therein of corresponding U.S. Appl. No. 16/534,859, filed Aug. 7, 2019, issued Apr. 13, 2021 as U.S. Pat. No. 10,977,370 B2.
File History and the references cited therein of corresponding U.S. Appl. No. 16/849,808, filed Apr. 15, 2020, issued Apr. 11, 2023 as U.S. Pat. No. 11,625,485 B2.
File History and the references cited therein of corresponding U.S. Appl. No. 17/188,217, filed Mar. 1, 2021, issued Nov. 22, 2022 as U.S. Pat. No. 11,507,663 B2.
File History and the references cited therein of corresponding U.S. Appl. No. 18/047,437, filed Oct. 18, 2022, issued Jan. 30, 2024 as U.S. Pat. No. 11,886,591 B2.
File History and the references cited therein of corresponding U.S. Appl. No. 18/179,711, filed Mar. 7, 2023, issued Jul. 2, 2024 as U.S. Pat. No. 12,026,257 B2.
File History and the references cited therein of corresponding U.S. Appl. No. 18/182,979, filed Mar. 13, 2023, published Oct. 5, 2023 as U.S. Publication No. 2023-0319087 A1.
File History and the references cited therein of corresponding U.S. Appl. No. 18/453,296, filed Aug. 21, 2023.
File History and the references cited therein of corresponding U.S. Appl. No. 18/536,223, filed Dec. 11, 2023, issued Feb. 25, 2025 as U.S. Pat. No. 12,235,962 B2.
File History and the references cited therein of corresponding U.S. Appl. No. 19/031,062, filed Jan. 17, 2025, published Jul. 10, 2025 as U.S. Publication No. 2025-0225243 A1.
File History of corresponding U.S. Appl. No. 63/126,162, filed Dec. 16, 2020.
File History of corresponding U.S. Appl. No. 63/126,162, filed Apr. 9, 2021.
File History of corresponding U.S. Appl. No. 63/173,191, filed Apr. 9, 2021.
File History of corresponding U.S. Appl. No. 63/325,419, filed Mar. 30, 2022.
File History of related U.S. Appl. No. 63/315,827, filed Mar. 2, 2022.
File History of related U.S. Appl. No. 63/373,165, filed Aug. 22, 2022.
File History of related U.S. Appl. No. 63/479,956, filed Jan. 13, 2023.
Slawinski et al., "Applications of graph integration to function comparison and malware classification", Arxiv Org Cornell, University Library, 201 Olin Library Cornell, University Ithaca, Oct. 11, 2018, XP081465552.
U.S. Appl. No. 61/989,965, filed May 7, 2014, "Distributed System for Bot Detection", 54 pages.
International Search Report and Written Opinion received for PCT Patent Application No. PCT/US24/44217, mailed on Jan. 15, 2025, 24 pages.

* cited by examiner

| Date/Time | Event Description | Event Severity | Artifacts |
|---|---|---|---|
| 2024-08-26 13:41 | Download File | Low | |
| 2024-08-26 14:16 | Multi Action Script | Medium | View Artifact |
| 2024-08-26 14:53 | Terminate Processes | Medium | |
| 2024-08-26 15:02 | Start Process | High | |
| 2024-08-26 15:28 | Delete Files | High | View Artifact |
| 2024-08-26 15:36 | Upload Data | High | View Artifact |
| 2024-08-26 15:48 | Terminate Processes | Medium | |

FIG. 11

REMOTE OPERATIONS FORENSICS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to U.S. Provisional Application No. 63/580,341, filed Sep. 1, 2023, the contents of which are hereby incorporated by reference in its entirety and for all purposes as if set forth fully herein.

TECHNICAL FIELD

This application is generally related to computer security incident investigation and response. Some embodiments relate to remote operations forensics.

BACKGROUND

Unauthorized access, malicious software, and other security issues are significant problems in computing. When a security incident occurs, it is important to collect and analyze information to identify causes, identify bad actors, and so forth. However, there are significant difficulties associated with investigating security incidents. Accordingly, there is a need for improved systems and methods for responding to security incidents.

SUMMARY

For purposes of this summary, certain aspects, advantages, and novel features are described herein. It is to be understood that not necessarily all such advantages may be achieved in accordance with any particular embodiment. Thus, for example, those skilled in the art will recognize the disclosures herein may be embodied or carried out in a manner that achieves one or more advantages taught herein without necessarily achieving other advantages as may be taught or suggested herein.

All of the embodiments described herein are intended to be within the scope of the present disclosure. These and other embodiments will be readily apparent to those skilled in the art from the following detailed description, having reference to the attached figures. The invention is not intended to be limited to any particular disclosed embodiment or embodiments.

In some embodiments, the techniques described herein relate to a computer-implemented method for forensic artifact collection, the computer-implemented method including: collecting, by an agent installed on an endpoint, endpoint monitoring data; transmitting, by the agent over a network, the endpoint monitoring data to a cloud server; receiving, by the agent from the cloud server over the network, an indication of a security incident, wherein the security incident is determined based at least in part on the endpoint monitoring data; and in response to receiving the indication of the security incident: identifying, by the agent, a set of forensic artifact types; determining, by the agent, a set of forensic artifacts, wherein each forensic artifact of the set of forensic artifacts is associated with at least one forensic artifact type of the set of forensic artifact types; and transmitting, by the agent, the set of forensic artifacts to a destination server, wherein the set of forensic artifacts is stored in random access memory, wherein identifying the set of forensic artifact types, determining the set of forensic artifacts, and transmitting the set of forensic artifacts to the destination server are performed without writing to a non-volatile storage medium of the endpoint.

In some embodiments, the techniques described herein relate to a computer-implemented method, wherein transmitting the set of forensic artifacts includes: generating a plurality of batches, wherein each batch of the plurality of batches includes a subset of the set of forensic artifacts, wherein each batch of the plurality of batches has a batch size that is less than or equal to a maximum batch size; and transmitting each batch of the plurality of batches to the destination server.

In some embodiments, the techniques described herein relate to a computer-implemented method, wherein the maximum batch size is based at least in part on an amount of random access memory of the endpoint.

In some embodiments, the techniques described herein relate to a computer-implemented method, wherein the set of forensic artifacts is determined based at least in part on the endpoint monitoring data, wherein the endpoint monitoring data indicates at least one of a file operation or a network operation.

In some embodiments, the techniques described herein relate to a computer-implemented method, wherein the indication of the security incident includes an indication of a type of the security incident, wherein determining the set of forensic artifacts is based at least in part on the type of the security incident.

In some embodiments, the techniques described herein relate to a computer-implemented method, wherein to determine the set of forensic artifacts, the computer-implemented method further includes: determining a pre-defined rule based on the type of the security incident, wherein the pre-defined rule specifies at least one of: a type of forensic artifact to collect, a log to collect, or a file to collect.

In some embodiments, the techniques described herein relate to a computer-implemented method, wherein transmitting the set of forensic artifacts to the destination server includes: creating a plurality of threads, wherein a number of threads in the plurality of threads is based on a number of forensic artifact types included in the set of forensic artifact types; wherein each thread of the plurality of threads is configured to transmit forensic artifacts having a particular forensic artifact type, wherein transmitting forensic artifacts having the particular forensic artifact type includes transmitting an indication of the particular forensic artifact type to the destination server.

In some embodiments, the techniques described herein relate to a computer-implemented method, further including receiving an indication of a network address of the destination server.

In some embodiments, the techniques described herein relate to a computer-implemented method, further including receiving a credential for accessing the destination server.

In some embodiments, the techniques described herein relate to a computer-implemented method, wherein the set of forensic artifacts includes forensic artifacts created from an initial time to a current time, wherein the initial time is correlated with a time when the agent began operating on the endpoint.

In some embodiments, the techniques described herein relate to a computer-implemented method for security incident data collection and analysis, the computer-implemented method including: receiving, via a network from an agent operating on an endpoint, endpoint monitoring data; storing the endpoint monitoring data in a data lake; analyzing the endpoint monitoring data to identify security threats; identifying, based on the analyzing, a security threat; transmitting, via the network to the endpoint, an indication of the security threat on the endpoint, wherein transmitting the indication of the security threat causes the agent to collect a set of forensic artifacts present on the endpoint; receiving, from the agent operating on the endpoint, the set of forensic artifacts; storing each artifact of the set of forensic artifacts in the data lake; determining an association of one or more artifacts of the set of forensic artifacts and one or more data items of the endpoint monitoring data.

In some embodiments, the techniques described herein relate to a computer-implemented method, further including: determining an artifact of the set of forensic artifacts, and artifact type; processing the artifact based at least in part on the artifact type to extract one or more artifact features; and storing the one or more artifact features in the data lake.

In some embodiments, the techniques described herein relate to a computer-implemented method, further including: generating an event timeline, wherein the event timeline includes a data item of the one or more data items in the endpoint monitoring data, and wherein the event timeline includes an indication of the one or more artifacts in the set of forensic artifacts associated with the data item; and causing presentation to a user of the event timeline.

In some embodiments, the techniques described herein relate to a computer-implemented method, wherein the one or more data items of the endpoint monitoring data includes a plurality of data items, wherein the computer-implemented method further includes: ranking each data item of the plurality of data items using a ranking model, wherein the ranking model is a machine learning model trained using supervised learning on a training set of training data items to rank a security incident significance a data item; and identifying, based on the ranking, a set of most relevant data items; and providing a list of data items in the set of most relevant data items to a user device in response to receiving a request from the user device for the list of data items in the set of most relevant data items.

In some embodiments, the techniques described herein relate to a computer-implemented method, further including: receiving a natural language question from a user device operated by a user; generating a prompt for a large language model based on the natural language question; providing the prompt to the large language model; receiving a suggested data lake query from the large language model; and providing an indication of the suggested data lake query to user device for display to the user.

In some embodiments, the techniques described herein relate to a computer-implemented method, further including: identify a threat type of the security threat, wherein transmitting the indication of the security threat includes transmitting an indication of the threat type of the security threat, wherein the threat type is used to identify one or more types of forensic artifacts to be transmitted by the agent.

In some embodiments, the techniques described herein relate to a computer-implemented method, further including: transmitting, via the network to the endpoint, an indication of a pre-defined forensic artifact collection rule, wherein the pre-defined forensic artifact collection rule indicates one or more types of forensic artifacts to be transmitted by the agent, and wherein the pre-defined forensic artifact collection rule is determined based at least in part on a threat type of the security threat In some embodiments, the techniques described herein relate to a computer-implemented method, further including: determining a destination address for receiving the set of forensic artifacts; and transmitting, over the network to the endpoint, the destination address.

In some embodiments, the techniques described herein relate to a computer-implemented method, further including: transmitting, over the network to the endpoint, a credential for transmitting the set of forensic artifacts.

In some embodiments, the techniques described herein relate to a computer-implemented method, wherein the data lake is segmented into a plurality of segments, wherein each segment of the plurality of segments is associated with an organization, wherein each segment of the plurality of segments is only accessible by users associated with the organization associated with the segment.

In some embodiments, the techniques described herein relate to a computer-implemented method, wherein the data lake is at least partially immutable.

In some embodiments, the techniques described herein relate to a computer-implemented method, wherein the set of forensic artifacts is determined based at in part by analyzing the endpoint monitoring data.

In some embodiments, the techniques described herein relate to a computer-implemented method, further including: generating a prompt for large language model, the prompt configured to cause the large language model to generate a summary of the security incident; and providing the prompt to the large language model.

In some embodiments, the techniques described herein relate to a computer-implemented method, wherein generating the prompt includes using retrieval augmented generation to identify contextual information, wherein the prompt includes at least a portion of the contextual information or information determined from the contextual information.

BRIEF DESCRIPTION OF THE DRAWINGS

The drawings are provided to illustrate example embodiments and are not intended to limit the scope of the disclosure. A better understanding of the systems and methods described herein will be appreciated upon reference to the following description in conjunction with the accompanying drawings.

FIGS. 10 and 11 illustrate example timelines according to some embodiments.

DETAILED DESCRIPTION

Figure 1:
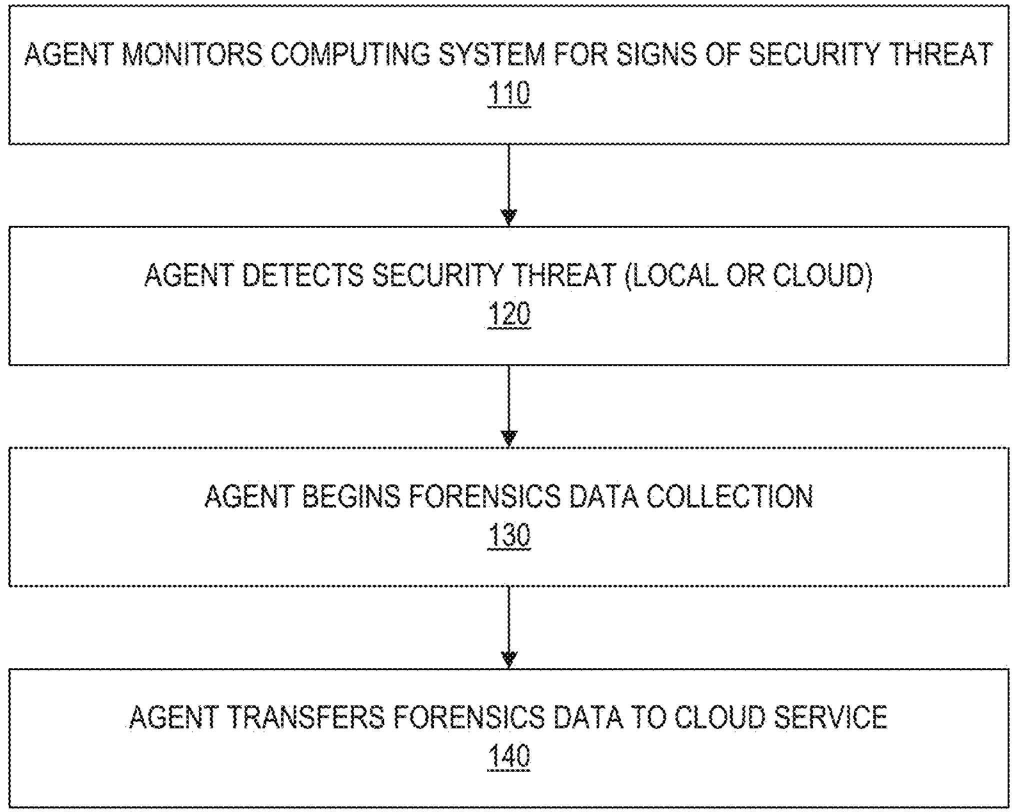
FIG. 1 is a flowchart that illustrates an example data collection process according to some embodiments.

Although certain preferred embodiments and examples are disclosed herein, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Some operations can be performed in an order different than the order shown. Some operations can be combined or separated into multiple operations. Some operations can be performed in parallel. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one embodiment may be combined with the features of other embodiments. Such modifications and variations are intended to be included within the scope of the present disclosure.

When a security incident occurs on a computer system (also referred to as an endpoint herein), such as unauthorized access or a malware attack, it can be important to collect data from the system to determine the root cause of the security incident, to determine the extent of damage resulting from the incident (e.g., exfiltrated files, corrupted files, encrypted files, altered security settings, altered network configurations, compromised user accounts, and so forth). Root cause analysis can reveal a reason for the security incident. For example, a security incident may occur because a software patch was not applied, permissions were misconfigured or overly permissive, network settings were misconfigured (e.g., one or more ports were left open that should have been closed, one or more network services were running that should have been disabled, etc.), unauthorized software was installed by a user, the system was compromised using a zero-day exploit, an employee or contractor misappropriated data they were granted access to, and so forth. In some cases, malware, malicious users, authorized users who wish to conceal a violation of an organization's computing policies, etc., may attempt to cover up the root cause of a security incident, for example by uninstalling software, modifying logs, altering system configuration, and so forth. As used herein, unless context clearly indicates otherwise, computer system, system, an endpoint can refer to a computer system such as a tablet, server, laptop, desktop, smartphone, and/or the like.

Even without active concealment efforts, important data for investigating security incidents can be lost. For example, the state of a system can change merely because the system continues to operate. For example, disk writes can result in the permanent deletion of potentially important data. Modifications to storage volumes can occur due to the use of swap or virtual memory, automated processes that run on the system (e.g., backup processes, monitoring processes, software updaters, etc.), and so forth.

Accordingly, it can be important to capture data for investigating a security incident as close in time as possible to when the incident occurs to reduce the risk that important investigative information is lost. The approaches described herein can be used to automatically collect data in response to security incidents, enabling a more complete picture of systems at times leading up to, during, and after security incidents. As described further herein, the approaches herein can enable faster, more accurate, and/or more complete analysis of security incidents. Advantageously, as described herein, a single agent can be used for both endpoint monitoring and forensic artifact collection, which can enable more rapid data collection, reduce forensic artifact loss and/or corruption, etc.

As described herein, different types of security data can be broadly categorized as monitoring data and forensic artifacts. One or both types of security data can be used when investigating a security incident. Endpoint monitoring data (also referred to herein as monitoring data) and forensic artifacts are not necessarily mutually exclusive. There can be some overlap between monitoring data and forensic artifacts, though in general forensic artifacts can be considered to be more detailed or feature-rich than monitoring data. Monitoring data can include endpoint detection and response (EDR) data, extended detection and response (XDR) data, telemetry data, and so forth.

Generally, monitoring data can provide a limited level of information about activity that occurs on a computing system, while forensic artifacts can provide a more detailed view of activity on a computing system. For example, monitoring data might indicate that a file was modified at a particular time, while forensic artifacts may provide more in-depth information, such as the owner of the file, file permissions, creation time, modification time, the user who modified the file, a file hash before the modification, a file hash after the modification, etc. In some cases, forensic artifacts can include file contents. In some embodiments, forensic artifacts can include information such as registry dumps, memory dumps, process dumps, master file table (MFT) data, web browser history, web browser cache, etc. Additional examples of forensic artifacts can include, for example, USN Journal files, PowerShell histories, prefetch files, LNK files, system resource usage monitor information, full memory dumps, daemon listings, user listings, ports listings, cron job listings, environment variables, kernel configurations, SSH configurations, password policies, iptables configurations, GRUB configurations, syslinux configurations, shell histories, shell configurations, nftables configurations, and so forth. In some embodiments, when a security incident is detected, an agent can be configured to upload all available forensic artifacts, endpoint monitoring data, or both. For example, the agent can upload all available data from the time the agent began operating on the endpoint.

Broadly, monitoring data can be used to detect a security incident and provide some investigatory utility, while forensic artifacts provide a richer set of information that can be used to more deeply understand what happened leading up to and/or during a security incident. As a non-limiting example, monitoring data might indicate that a file was opened and subsequently saved, but may not provide information about changes to the file, while forensic artifacts can indicate that the file was modified and may even be able to provide information about what was changed in the file, for example by comparing a version of a file from before a security incident (e.g., from a backup) to the file as it existed during or after the security incident. As another example, monitoring data might indicate that a file's permissions were changed, but may not provide the specific permissions before and after the change, at least some of which may be available in forensic artifacts.

In some embodiments, forensic artifacts can include process listings, port status, service listings, master file tables (MFTs), AmCache files, JumpLists, memory dumps, and so forth. Such artifacts can be significant when conducting security incident investigations. For example, an MFT may include an entry for each file on a file system volume. The MFT may include file metadata and/or other file information. For example, an MFT entry may include a file's size, timestamps, permissions, data content, etc. In some embodiments, data may be stored in the MFT itself. In some embodiments, the MFT may describe a space outside the MFT where information is stored. In some embodiments, the MFT may maintain a record of current files on a file system volume, may maintain records of deleted files on a file system volume, or both. For example, when a file is deleted, the MFT entry or entries associated with the file can be marked as free so that the space used by the file can be reused. In some cases, the deleted file may remain recoverable until data is written to the space used by the deleted file. In some embodiments, the MFT can be used to determine which deleted files are still recoverable, which can be important for data recovery, investigation, etc. For example, if a malicious actor or a piece of malware attempted to cover its tracks by deleting files, it may be possible to recover the deleted files, or at least some portion of the deleted files, which can provide significant insight into a security incident.

AmCache artifacts are another type of forensic artifact that can provide valuable information for investigating a security incident. AmCache artifacts can provide a record of processes recently run on a system, paths of files that have recently been executed, and so forth. In some embodiments, AmCache artifacts can provide information about drivers (e.g., driver ID, driver name, driver version, driver path, any services associated with the driver, timestamps, checksums, an indication of whether the driver operates in kernel mode, etc.). In some embodiments, AmCache artifacts may indicate which devices are connected to a system, whether the devices are active, whether the devices are paired, whether the devices are networked, device manufacturer, timestamps, etc. In some embodiments, Jump Lists may indicate which files, folders, etc., have recently been accessed.

While some of the items described above relate specifically to computing devices running a Windows operating system, it will be appreciated that other operating systems, such as Linux and macOS, can provide similar information, which may be stored in locations that are known or readily discernable by those of skill in the art.

In some embodiments, file metadata, but not file contents, may be used in analyzing a security incident. In some embodiments, file contents may be used additionally or alternatively.

In some embodiments, endpoint detection and response (EDR) and/or extended detection and response (XDR) can be used to monitor activity on an endpoint and to collect monitoring data. In some embodiments, EDR/XDR can provide real-time and/or near real-time monitoring of computing systems. For example, EDR/XDR can provide information such as local and external addresses to which the system is connected, logged in accounts, process executions, network activity (e.g., open ports, connections, DNS requests, etc.), file creation, removable media (e.g., removable USB drives, SD cards) usage, and so forth. In some embodiments, EDR/XDR data may provide less detailed information than the forensic artifacts described above.

In some cases, monitoring data can be collected, transferred, processed, and so forth during normal operation of a computing system. For example, an agent running on an endpoint can periodically or continuously send endpoint data to a cloud server for storage, analysis, etc. In some embodiments, forensic artifacts, which may be substantially larger (for example, several megabytes or gigabytes, as compared to kilobytes or a few megabytes as can be more typical for monitoring data), may only be collected in response to a security incident, or may be collected on an endpoint but not transferred to a data lake unless there is a security incident. It can be desirable to minimize the transfer of forensic artifacts to external systems, as forensic artifacts may, in some cases, pose privacy risks, data security risks, etc., as more detailed information may be collected, including file contents, browser histories, browser caches, stored login credentials, etc. Accordingly, it can be advantageous to only collect or transfer forensic artifacts when there is a security incident that warrants further investigation.

In conventional approaches, routine monitoring data is collected using a first application running on a computing system, and forensic artifacts are collected using a second application running on the computing system or via other means. For example, in some approaches, rather than using a forensic artifacts collection application on the computing system, storage (e.g., hard drives, solid state drives, etc.) is removed from the computing system and attached to a second computing system in a read-only manner for forensic data collection. Such an approach can help ensure that data is preserved once forensic data collection begins but offers no protection against changes prior to the storage device being removed from the computing system. Additionally, such an approach limits the types of data that can be collected. For example, a memory dump can be obtained by a forensic artifact collection program running on the computing system, but doing this would not be possible by connecting a storage medium to another computer system for analysis.

During normal operation, an agent (e.g., an EDR agent) may collect a limited amount of data. For example, an agent may collect specific subsets of information that are most useful for detecting security incidents or security threats. For example, an agent may only collect events from specific logs (e.g., system logs but not application logs), only events with particular severity (e.g., only high severity events), and so forth. These are only examples, and the details of which items are collected can vary depending on the endpoint, organization, etc. When a security incident is detected, the agent can be configured to collect additional information, such as capturing all severities, capturing all available logs, and so forth. In some embodiments, the agent can be configured to collect different information depending upon the type of security incident. For example, different data may be collected in the case of a ransomware attack as compared to what is collected when a trojan is detected.

Security incident detection can be carried out in various manners, for example via local detection or remote detection. In local detection, the agent itself can parse the monitoring data and identify security threats. In a remote detection approach, monitoring data collected by the agent is transmitted to a cloud server for processing. The cloud server can send a notification to the agent whenever a security threat is identified. Collection and transmission of forensic artifacts can occur after a security incident is detected.

Conventional approaches can lead to significant delays between the time a security incident is detected and the time forensic artifacts are collected. As described herein, such delays can be detrimental to security investigations, as evidence may be lost or destroyed before it can be collected. Additionally, the use of separate applications, extraction of data from drives removed from a computing system, and/or other conventional forensic artifact collection methods can result in additional costs (e.g., costs to license software, costs to pay employees or contractors to remove drives and extract data from them, etc.), additional computing overhead (e.g., increased processor usage, memory usage, etc., as a result of additional applications running on a computing system), and so forth. Accordingly, there is a need for security software that can provide both monitoring and forensic artifact collection functionality.

In some embodiments, a single application (e.g., a single agent running on an endpoint) can include both endpoint monitoring and forensic artifact collection capabilities. This can reduce the number of security-related processes that run on a computing system and can reduce computing resources (e.g., processor, RAM, etc.) consumed by security-related activities. In some cases, this can result in a significant performance improvement. Additionally, by utilizing a single agent, if the agent detects an issue during routine monitoring, the agent can automatically begin forensic artifacts collection, which can enable more rapid response to a security incident and, in some cases, reduce or eliminate the loss of forensic artifacts. A significant advantage of using a single agent for monitoring and forensic artifact collection is that there is no need to start a separate application to collect forensic artifacts, as merely launching an application can result in the destruction of certain evidence. Additionally, if a separate forensic artifacts collection process is used, this can increase the likelihood that information is lost. For example, when a process starts, there can be disk activity, RAM activity, etc., that can result in the loss of data.

In some embodiments, the agent can collect forensic artifacts based at least in part on information gathered from monitoring, which can indicate a type of security issue, an indication of which files have been implicated and thus should be collected, etc. In some embodiments, forensic artifacts are collected according to pre-configured rules, which can result in more rapid forensic artifacts collection. For example, specific forensic artifacts can be automatically collected in response to a security threat being detected. The specific artifacts can depend on the type of threat detected (e.g., detected by an agent or by a cloud service working on cooperation with the agent).

Even if forensic artifacts can be collected before they are deleted, corrupted, or otherwise rendered unavailable or unusable, working with endpoint monitoring data and forensic artifacts can be difficult. For example, endpoint monitoring data and forensic artifacts may be stored in different locations (e.g., in different databases, filesystems, etc.), stored in different formats, and so forth. Thus, it can be difficult to correlate endpoint monitoring data and forensic artifacts. A lack of connection between endpoint monitoring data and forensic artifacts can make it more difficult or even impossible to uncover certain indicators of compromise (IOCs), identify advanced attack patterns, understand the tactics, techniques, and procedures (TTPs) used by threat actors, and so forth. Fragmented data, missing data, a lack of correlation between data, and so forth can make it difficult to determine key insights when investigating a security incident. This can lead to inefficiency, prolonged response times, incomplete or incorrect investigatory conclusions, and so forth.

In some cases, an operating system may be configured to collect information related to various types of activity that occur on an endpoint. This information can be used to analyze an endpoint to determine the root cause of a security incident, the extent of damage resulting from a security incident, measures taken to conceal a security incident, and so forth. In some cases, monitoring software (e.g., an agent such as an EDR or XDR agent) can collect such information, additional information, subsets of information, different information, or any combination thereof. In some embodiments, the agent can communicate with a cloud service. In some embodiments, the agent can determine if a security threat is present on a computing system. For example, the agent can processor endpoint monitoring data locally to determine if the presence of a security threat. In some embodiments, the agent may send monitoring data to a cloud service, and the cloud service may analyze the data to determine if a security threat is present on a computing system. The cloud service can notify the agent if a threat is detected. In some embodiments, an agent can use a hybrid approach, in which some detection is carried out locally and other detections are performed using a cloud service. As an example, detections of known malicious files may be performed locally, while more complex analysis (e.g., analyzing activity to identify malicious behavior) may be performed using a cloud service.

In some approaches, forensic artifacts collected at the time of the security incident may be used to determine operations performed by malware, an unauthorized user, etc. Artifacts collected during and/or after the security incident may reveal attempts to conceal the security incident. Artifacts collected before the security incident may indicate a baseline for the system, may indicate when staging for the security incident occurred (for example, when a user installed an unauthorized program or changed a system configuration setting, when malware first became present on the system, etc.). For example, in some cases, malware may infect a computing system and remain dormant for a period of time. Artifacts can provide significant information for determining the root cause of a security threat, determining the scope of a security threat (e.g., what files, settings, etc., were changed, copied, read, etc.).

As described herein, various solutions exist for monitoring computing systems to detect security incidents and for collecting forensic data; however, there can be significant drawbacks to using such solutions. For example, monitoring software and/or forensic data collection software may consume significant resources, may cause modifications to the computing system, etc. Additionally, monitoring solutions and/or forensic data collection software may not reveal the root cause of a security incident if relevant data is not collected. For example, while monitoring software may detect activity indicative of a security incident such as unexpected file modifications, unexpected file copies (e.g., to removable storage media), unexpected network activity, and so forth, the monitoring software may not collect sufficient information to determine the root cause of the security incident, may not process or present the information in a way that renders it understandable by security incident responders, and so forth. Similarly, if forensic data collection software is run after an incident, some evidence may be lost. In some cases, the forensic data collection software may itself cause evidence to be lost.

In some cases, monitoring software and/or forensic data collection software may write to non-volatile storage (e.g., to a storage device such as a hard drive or solid state drive). For example, monitoring software and/or forensic data collection software may store logs or other information to a local storage device, a network storage device to which the computing system has access (e.g., cloud storage, Server Message Block (SMB) share, Network File System (NFS) share, etc.), and so forth. Such writes or other filesystem modifications may compromise the ability to collect data that can be used for analyzing a security incident. For example, if a file is deleted from disk as part of a malware attack (for example, malware may delete files to render the system inoperable, to remove user files, to cover its tracks (e.g., self-deleting malware), etc.), writing additional data to the same disk may render the file unrecoverable.

In some conventional approaches, an organization may deploy endpoint detection and response (EDR) and/or extended detection and response (XDR) software to monitor a variety of endpoints such as laptops, desktops, servers (e.g., local servers, cloud servers, etc.). Endpoints can be physical systems or virtual systems (e.g., virtual machines). In some cases, EDR/XDR agents (generally, agents) can provide real-time or nearly real-time monitoring data that can be used to identify computing devices that may be experiencing a security incident. The monitoring data can include information such as, for example, credential access, program execution, command and control, network access, system logs, etc.

In response to a security incident, an organization may collect forensic data from a device. Forensic data can include, for example, autorun information, installed applications listings, network connections information (e.g., active network connections, address resolution protocol (ARP) cache tables, DNS resolver caches, network adapter configurations, firewall logs, prefetch file listings, process listings, scheduled task listings, security event logs, services listings, SMB session listings, temporary directory listings, user listings, group listings, mounted disk volume listings, partition listings, shell history, loaded kernel modules, etc.). In some embodiments, forensic data can include file contents, search histories, browser histories, browser caches, and so forth.

In some embodiments, an agent can be configured to collect a memory dump as part of a forensic data collection process. Memory dumps can provide a snapshot of a system's memory at a specific point in time, which can be used to investigate security incidents. Memory dumps can be used for malware analysis, incident response, vulnerability analysis, data leakage detection, root cause analysis, and so forth. For example, memory dumps can be analyzed to identify malicious code that is running in memory. Analysis of memory dumps can provide insight into data access patterns, communication patterns, persistence mechanisms, and so forth of malicious code. Memory dumps can be used to understand the state of a system at the time of a security incident, which can help identify the attack vector, extent of compromise, actions taken by an attacker, and so forth. Memory dumps can help reconstruct a timeline of an attack. In some cases, memory dumps can be used for data leakage detection. For example, memory dumps can indicate the presence of sensitive information such as passwords, encryption keys, and other data that may be exposed in memory. An agent that combines endpoint monitoring and forensic artifact collection can be beneficial as such as process may already be running on an endpoint, thereby avoiding possible memory changes that could occur from launching a separate forensic artifact collection application.

In some embodiments, security software can be configured for ad-hoc forensic evidence collection, trigger-based forensic evidence collection, or both. In some embodiments, security software can be cross-platform. For example, security software can work on Linux, Windows, macOS, and/or other operating systems. In some embodiments, security software can operate on containerized systems, such as systems that use Kubernetes. In some embodiments, security software can be used to enable forensic investigations across endpoint devices (e.g., laptops, desktops, etc.), cloud systems, and/or the like. In some embodiments, ad-hoc and trigger-based forensic artifact collection can be used together. For example, certain forensic artifacts can be collected automatically in response to a security incident, while others may only be collected in response to a user request to collect additional artifacts. As an example, the master file table in systems that use the NTFS filesystem can be several gigabytes. Accordingly, it may be desirable to only collect the MFT whenever an analyst has a particular need for the data contained in the MFT.

As discussed above, using separate solutions for monitoring and forensic data collection can present significant challenges, including loss of significant data, additional resource consumptions, difficulty analyzing data, and so forth. Accordingly, there is a need for software that can combine monitoring and forensic data collection functionality. In some embodiments, such software can advantageously be configured to automatically collect forensic data in response to detecting a security threat. This can significantly reduce the time between the onset of a security incident and the onset of forensic data collection, which can provide a better picture of what happened during a security incident than may be possible if forensic data is collected a considerable time after the security incident has begun, by which time data may have been irretrievably lost or may require difficult and expensive recovery methods. In some embodiments, an agent can be provided that provides real-time or nearly real-time monitoring of an endpoint as well as forensic data collection. In some embodiments, forensic data collection can be triggered automatically (e.g., in response to detecting a security threat), on an ad-hoc basis, or both.

As described herein, one problem with monitoring software and forensic data collection software is the potential for such software to itself cause changes to a computing system that result in the loss of significant data. Accordingly, in some embodiments, an agent can operate in memory and may not write to a mounted volume. While such an approach can be relatively straightforward for monitoring data, which is typically small, it can present challenges for forensic data, which may take up several megabytes or gigabytes.

In some embodiments, an agent may use multiple data streams and/or multiple approaches to transferring data to a cloud service. For example, monitoring data may be sent as it is collected, while forensic artifacts may, in some embodiments, be divided into a plurality of chunks and each chunk may be transferred to the cloud service. In some embodiments, the chunk size can be based at least in part on an amount of memory (e.g., random access memory) present on an endpoint. In some embodiments, the chunk size can be based at least in part on network characteristics of the endpoint, such as connection stability, upload speed, etc. For example, chunk size can be limited to a certain fraction of the total RAM on an endpoint. In some embodiments, the order of forensic artifact uploads can be significant. For example, in some embodiments, a memory dump can be collected and uploaded before other files, logs, etc., are loaded into memory and transferred to the cloud service.

In some embodiments, endpoint monitoring data, forensic artifacts, or both are stored in a data lake (e.g., a database or collection of databases, file storage volumes, etc.). In some cases, data from multiple organizations may be stored in the same data lake. It can be important to store data in a forensically sound manner, as maintaining the integrity of the data can be important for security incident investigations may be needed for criminal investigations, civil suits, etc. In some embodiments, the data lake is segmented such that an organization can only access its own data. In some embodiments, the data lake is at least partially immutable. For example, in some embodiments, data in the data lake cannot be modified. In some embodiments, data in the data lake cannot be deleted or may be subject to a retention policy that disallows deletion until a minimum period of time has passed. The data lake can contain sensitive information. Thus, in some embodiments, data may be automatically deleted from the data lake once a retention period expires. In some embodiments, data may be automatically deleted once the retention period expires unless a hold has been placed on certain data (e.g., some data may be subject to a litigation hold and thus may be preserved in the data lake).

In some embodiments, security teams may wish to customize forensic data collection based on the type of security incident. This can have several advantages. For example, customized information collection can reduce resources used for data collection (e.g., processor usage, disk space usage, RAM usage, etc.) and/or can make analysis easier as data that is not relevant to the incident can be omitted. For example, in a ransomware attack, an application may be configured to collect information such as file changes, file encryption, ransom notes, etc., but may not collect other information that may be of lesser importance, such as program executions. As another example, malware that is designed to collect and transfer data may not modify other files on a volume but may attempt to, for example, modify cron jobs, scheduled tasks, services, etc. As described herein, in some embodiments, forensic data collection can be carried out according to pre-defined rules, which can be based on a type of activity (e.g., a type of security incident). Such an approach can enable the rapid collection of forensic artifacts, without delays caused by further analysis of logs, manual decisions made by security analysts, and so forth.

Even if endpoint monitoring data and forensic artifacts are available and sufficiently complete to conduct an effective root cause investigation, security analysts may struggle to analyze data and reach conclusions. For example, as discussed herein, often different types of data may be collected by different applications, stored in different formats, accessed using different applications, web pages, or other user interfaces, interacted with using different APIs or command line tools, and so forth. This can make it difficult to establish a clear timeline of events that can be used to determine what happened on a computing system. A security analyst may invest a large amount of time investigating a security incident, may miss important correlations between different types of data collected by different monitoring and/or forensics software, and so forth.

In some embodiments, the systems and methods described herein can provide robust timelining functionality. For example, in some embodiments, a system can provide a timeline of events that shows both monitoring data and forensic artifacts in a single timeline. In some embodiments, a user may be able to review the timeline to aid in determining root cause. In some embodiments, the timeline may include links to relevant data collected by a forensic artifacts collection tool, which can enable the user to easily locate and review relevant forensic artifacts. In some embodiments, the timeline is presented as a table. In some embodiments, the timeline is presented as a graphical timeline with significant events organized on the timeline.

Monitoring software, forensic artifacts collection software, and so forth can collect a large amount of information. In some cases, analysts may struggle to sort through such large volumes of data to determine which information is relevant to a security incident investigation. For example, systems logs may include information such as power mode policy resets, service auto start changes, system uptime, group policy updates, time service synchronization updates, Bluetooth link key logs, boot manager logs, sleep resumption logs, DNS resource record logs, audio subsystem errors, shutdown logs, timeout logs, domain controller connection failures, etc. In some cases, application logs may indicate that an application started successfully, successfully completed an operation, failed to complete an operation, etc. Much of this information may relate to ordinary functioning of the endpoint and be of little or no use in security incident investigation. However, analysts may struggle to identify the most relevant information for a security incident.

In conventional approaches, an analyst may manually filter logs and other data to try to identify the most relevant data for a security incident investigation. However, the volume of such data may make this an arduous and time-consuming process. In some cases, important information may be filtered out such that the analyst does not see important information, causing the analyst to make errors or otherwise develop an inaccurate and/or incomplete picture of the incident. Moreover, when different tools are used for monitoring and forensic artifact collection, data often becomes scattered across multiple sources, making it difficult to correlate events with artifacts.

Accordingly, it can be beneficial to provide automated analysis of security incidents. For example, in some embodiments, a machine learning (ML) model can be trained to identify events, files, etc., that are most likely to be relevant to a security incident investigation. For example, in some embodiments, a machine learning model can be trained using a dataset that comprises security incidents and associated relevant events, files, etc. In some embodiments, data from endpoints that are operating normally can be used as a control. For example, events that occur on both a system that is under attack and a system that is operating normally can be considered benign events. In some cases, frequency, volume, etc., of events can be considered. For example, if a particular event occurs on both a compromised system and an uncompromised system, but occurs much more frequently on the compromised system, such events may be important for analyzing a security incident.

A machine learning model can be trained using supervised or unsupervised learning. For example, in supervised learning, the most relevant data can be labeled as such, and a machine learning model can be trained to identify data that is similar to the most relevant data. The most relevant data can be data that is indicative of a security incident. In another approach, data (e.g., endpoint monitoring data, forensic artifacts) can be provided to a machine learning model, and the machine learning model can be trained to classify data as relevant or not relevant.

In some embodiments, a system can be configured to rank information so that the most relevant information is identified. For example, in some embodiments, a machine learning model as described above can be configured to output a numeric value that indicates how similar input data is to data that is relevant for a security incident investigation, and the numeric values can be used to rank the information. For example, information that is similar to information relevant to other security incidents may be ranked more highly than other information.

In some cases, an analyst may have a need to query data in the data lake. For example, an analyst may need to perform further investigation, identify related security incidents, identify common TTPs across incidents, and so forth. In some cases, an analyst may want to perform a deeper dive into specific events or series of events. Conventionally, analysts need to have extensive knowledge of the data lake as well as knowledge of how to write queries (e.g., in a language such as SQL). This can present a significant barrier to analyzing cybersecurity incidents, as many analysts may lack in-depth knowledge of query languages, the specific structure of the data lake, and so forth.

In some embodiments, a system can be configured to receive a natural language question from a user and generate a query based on the question. In some embodiments, the system can use a large language model (LLM) to generate a query. Utilizing an LLM to generate queries can have significant complexities and challenges. For example, to be effective, the LLM must generate queries that are both syntactically correct (e.g., correct SQL) and that accurately reflect the database schema.

Various techniques can be used to enable the use of an LLM to generate queries. In some embodiments, a system extracts the schema of a database or data lake. The schema can include, for example, table names, column names, data types, primary keys, foreign keys, relationships between tables, and so forth. In some embodiments, the system can represent the schema in a structured format, such as a JSON file, which can be interpreted by the LLM and used when generating queries.

In some embodiments, a system can use prompt engineering to improve query generation. For example, a contextual prompt can include schema information, examples of queries, etc., which can help the LLM understand the structure and relationships with the data lake. In some embodiments, the system can use "few-shot learning," in which several examples of input questions and their corresponding queries are provided to the LLM to guide the LLM in generating similar queries.

In some embodiments, template-based approaches can be used. For example, an LLM can extract key terms from a natural language question and substitute the key terms into the template. In some embodiments, the system can modify the key terms, for example mapping them to terms used in the data lake. In some embodiments, an LLM is trained to recognize common patterns in natural language questions and map them to query structures.

In some embodiments, a system can use interactive query refinement. For example, an LLM can generate an initial query. The system can provide the initial query to a user and refine the query based on user feedback or additional context provided by the user. This can be especially beneficial in cases where the user asks a question that is ambiguous or incomplete.

In some embodiments, a system can post-process and/or validate a generated query, for example to check for syntax errors, logical correctness, etc. In some cases, errors, logical inconsistencies, etc., can be corrected automatically by the system or the user can provide corrections. For example, in some embodiments, the system passes the generated query to a linter to check for syntax errors.

In some embodiments, rather than generating queries, queries can be predefined, and an LLM can be configured to receive a natural language question and identify a most relevant query or plurality of recommended queries. A system can be configured to present the query or plurality of recommended queries to a user, and in response to a user input, can execute a selected query.

Security Incident Documentation

While detecting security incidents, resolving security incidents, and uncovering the root cause of security incidents are of great importance, having clear documentation can also be significant for an organization. For example, clear documentation of past security incidents can help an organization to build a knowledge base that can inform decisions going forward, such as measures to take to reduce the likelihood of a threat actor succeeding in an attack against an organization, steps to take in investing security incidents, important information to consider when investigating a security incident, and so forth.

Manually preparing documentation can be a time-consuming and error-prone endeavor, and in some cases may not be done or may be done poorly. For example, a security analyst may not have time to prepare thorough reports. Even if a report is prepared, it may omit important information, make various assumptions (e.g., an analyst may make assumptions about a reader's knowledge), and so forth, which can limit the usefulness of the report.

In some embodiments, a system can be configured to use a machine learning model (e.g., a large language model) to summarize a security incident. For example, the summary can include a description of the incident such as when the incident occurred, what system was affected, how an attacker was able to exploit the system, and so forth. In some embodiments, the summary includes remediation steps taken to address the incident.

Multi-System Investigation

When an organization experiences a security incident, only a single endpoint may be implicated. However, in many cases, a large number of endpoints are involved. For example, a ransomware attack may affect tens, hundreds, or thousands of endpoints.

When multiple systems are attacked, data (e.g., monitoring data, forensic artifacts) can be collected from some or all affected systems. This information can include, for example, logs, memory dumps, disk images, network traffic captures, etc. This information can help identify commonalities and patterns across the affected systems. Data from multiple systems can be correlated to identify the attack vector, construct a timeline, determine the extent of the attack, and so forth. In some embodiments, such information can be used to trace lateral movements as an attack spreads across endpoints in a network.

Use of a cloud service and a common data lake can enable relatively easy analysis and correlation of security incidents across systems, providing deep insight into an attack.

Example Embodiments

FIG. 1 is a flowchart that illustrates an example data collection process according to some embodiments. At operation 110, an agent running on a computing system can monitor the computing system for signs of a security threat. At operation 120, the agent can detect a security threat. As discussed above, in some embodiments, the agent itself may detect the security threat. In some embodiments, the agent may send monitoring data to a cloud service, and the cloud service may provide an indication of a security threat to the agent. At operation 130, the agent can, in response to the security threat, begin collecting forensic artifacts. At operation 140, the agent can transfer the forensic artifacts to a cloud service.

Figure 2:
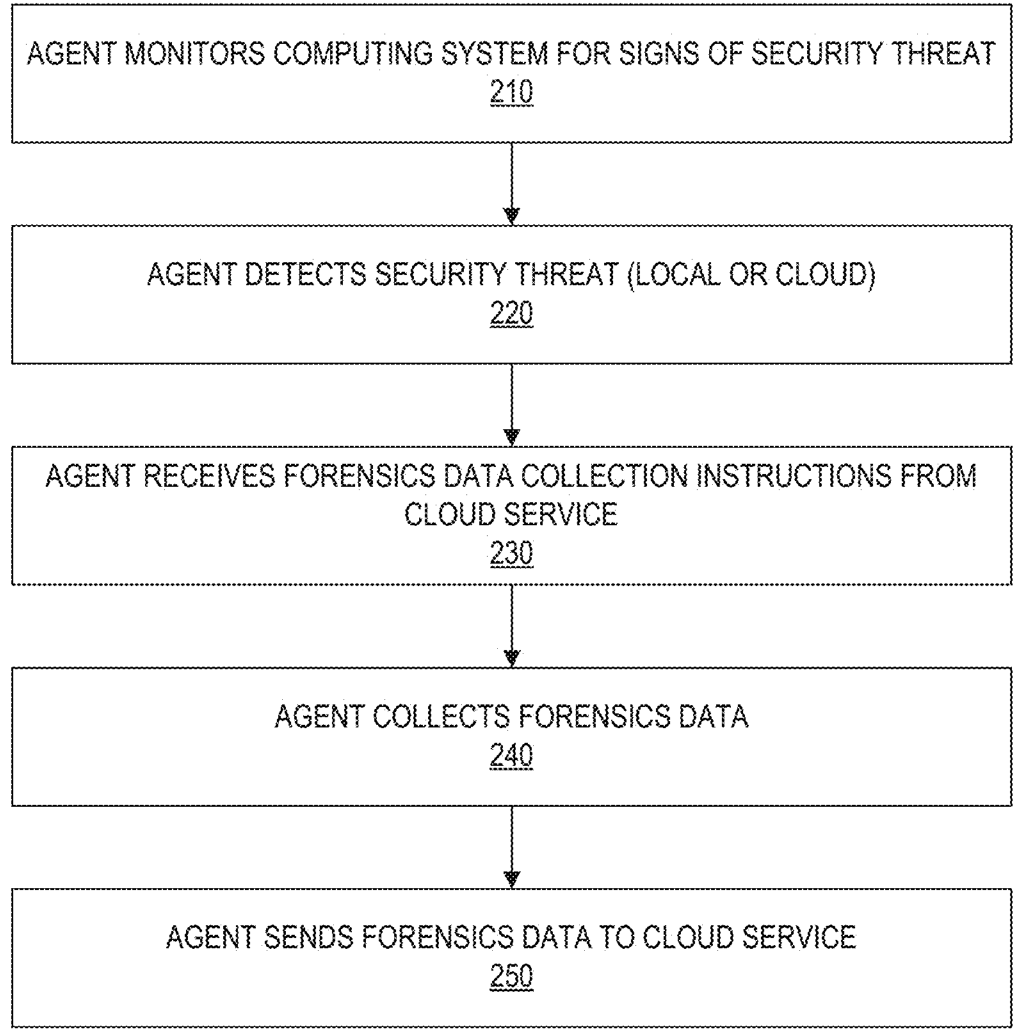
FIG. 2 is a flowchart that illustrates an example data collection process according to some embodiments.

FIG. 2 is a flowchart that illustrates an example data collection process according to some embodiments. At operation 210, an agent running on a computing system can monitor the computing system for signs of a security threat. At operation 220, the agent can detect a security threat. At operation 230, the agent can receive instructions from a cloud service to collect forensic data in response to the security threat. In some embodiments, different forensic data may be collected based on the type of security threat. At operation 240, the agent can collect the forensic data. At operation 250, the agent can send the forensic data to the cloud service.

Figure 3:
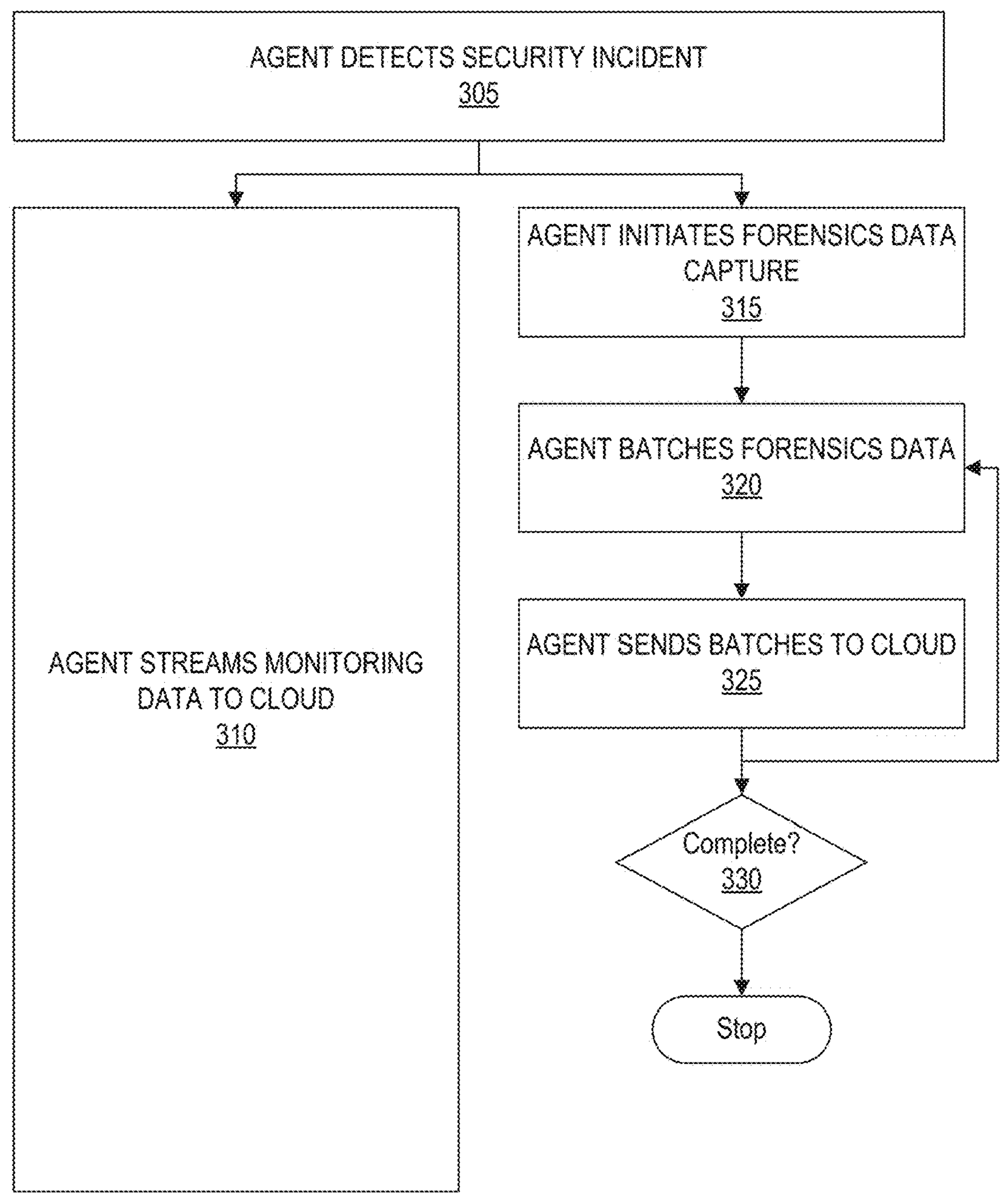
FIG. 3 is a flowchart that illustrates an example data transfer process according to some embodiments.

FIG. 3 is a flowchart that illustrates an example data transfer process according to some embodiments. At operation 305, the agent can detect a security incident. At operation 310, the agent can stream monitoring data to a cloud service. In some embodiments, the agent can send monitoring data to the cloud service continuously. In some embodiments, the agent can send monitoring data to the cloud service in real time or substantially real time. In some embodiments, the agent can send monitoring data to the cloud service periodically, for example every minute, five minutes, ten minutes, thirty minutes, hour, day, etc. At operation 315, the agent can begin collecting forensic data. At operation 320, the agent can prepare batches of forensic data. At operation 325, the agent can send the batched forensic data to the cloud service. At decision 330, if all batches have been completed, the forensic data transfer can stop at operation 335. If not all forensic data batches have been transferred, the process can continue batching and sending forensic data to the cloud service.

Figure 4:
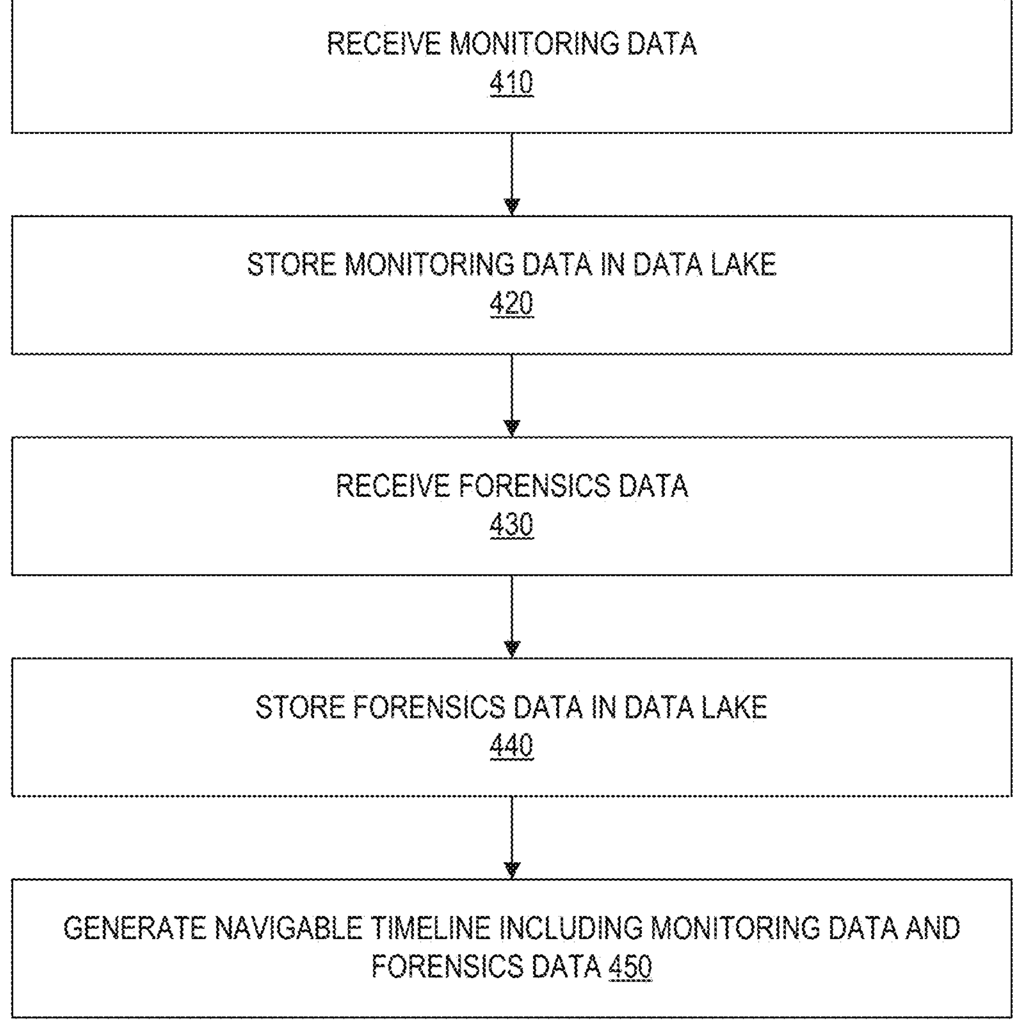
FIG. 4 is a flow chart that illustrates an example of timeline generation according to some embodiments.

FIG. 4 is a flow chart that illustrates an example of timeline generation according to some embodiments. While reference is made to a single server in the following description, it will be appreciated that different servers can be involved at different operations. At operation 410, a system (e.g., a cloud server) can receive monitoring data. At operation 420, the system can store the monitoring data in a data lake. In some embodiments, raw monitoring data may be stored. In some embodiments, the monitoring data may be parsed (e.g., JumpList data obtained from the Windows registry may be converted into a list of files rather than the format in which it is stored in the registry), and the parsed data may be stored in the data lake. At operation 430, the server can receive forensic artifacts. At operation 440, the server can store the forensic artifacts in the data lake (e.g., in the same data lake as the forensic artifacts). In some embodiments, the cloud service may store the forensic artifacts in a raw format. in some embodiments, the forensic artifacts may be parsed, and the parsed data may be stored in the data lake. At operation 450, the cloud service may generate a navigable timeline that includes the monitoring data and the forensic artifacts. In some embodiments, the timeline can be presented to a user in a web page, desktop application, mobile application, and so forth.

Figure 5A:
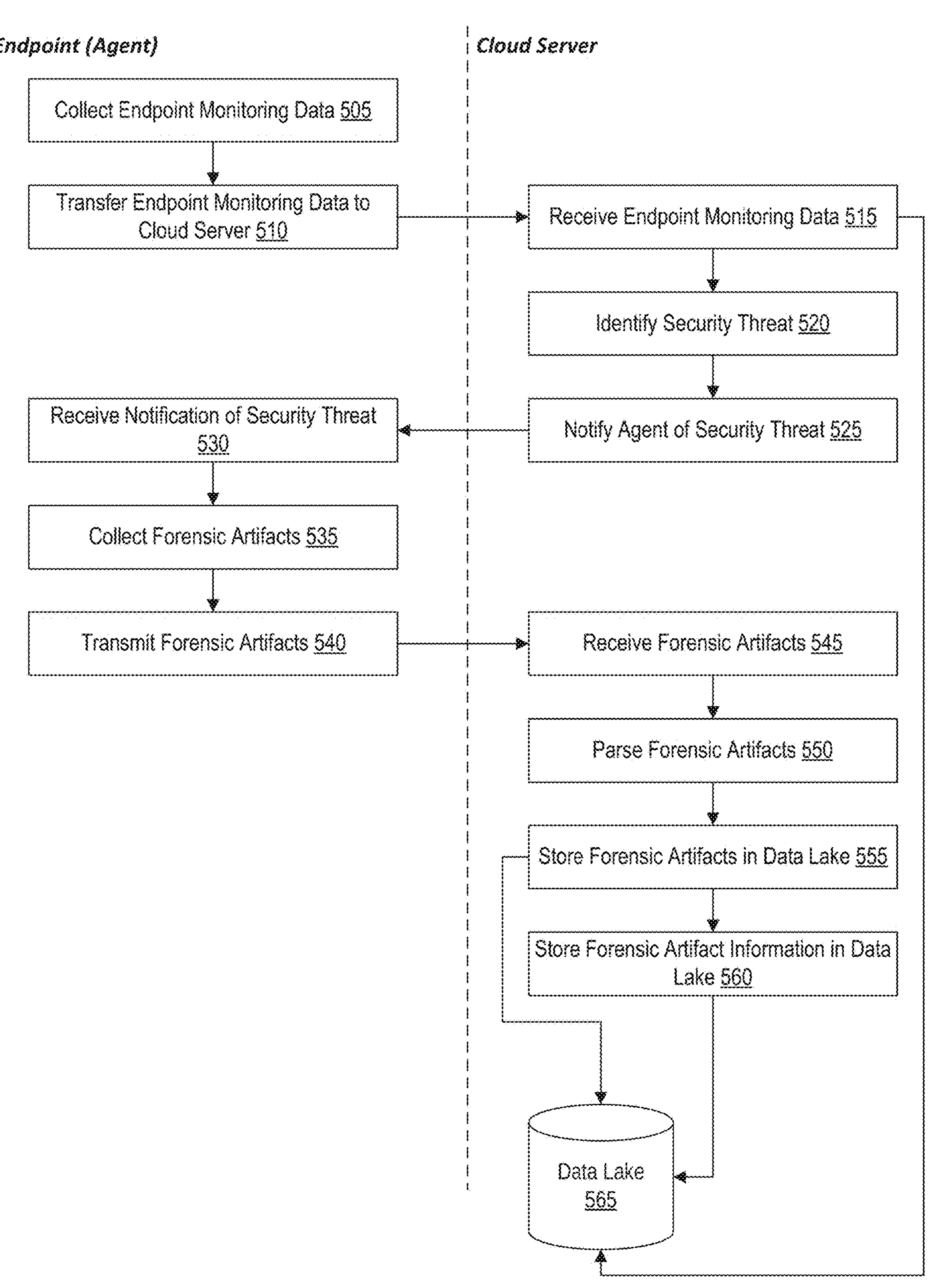
FIGS. 5A and 5B are flowcharts that illustrated example processes for detecting security threats and collecting forensic artifacts according to some embodiments.
Figure 5B:
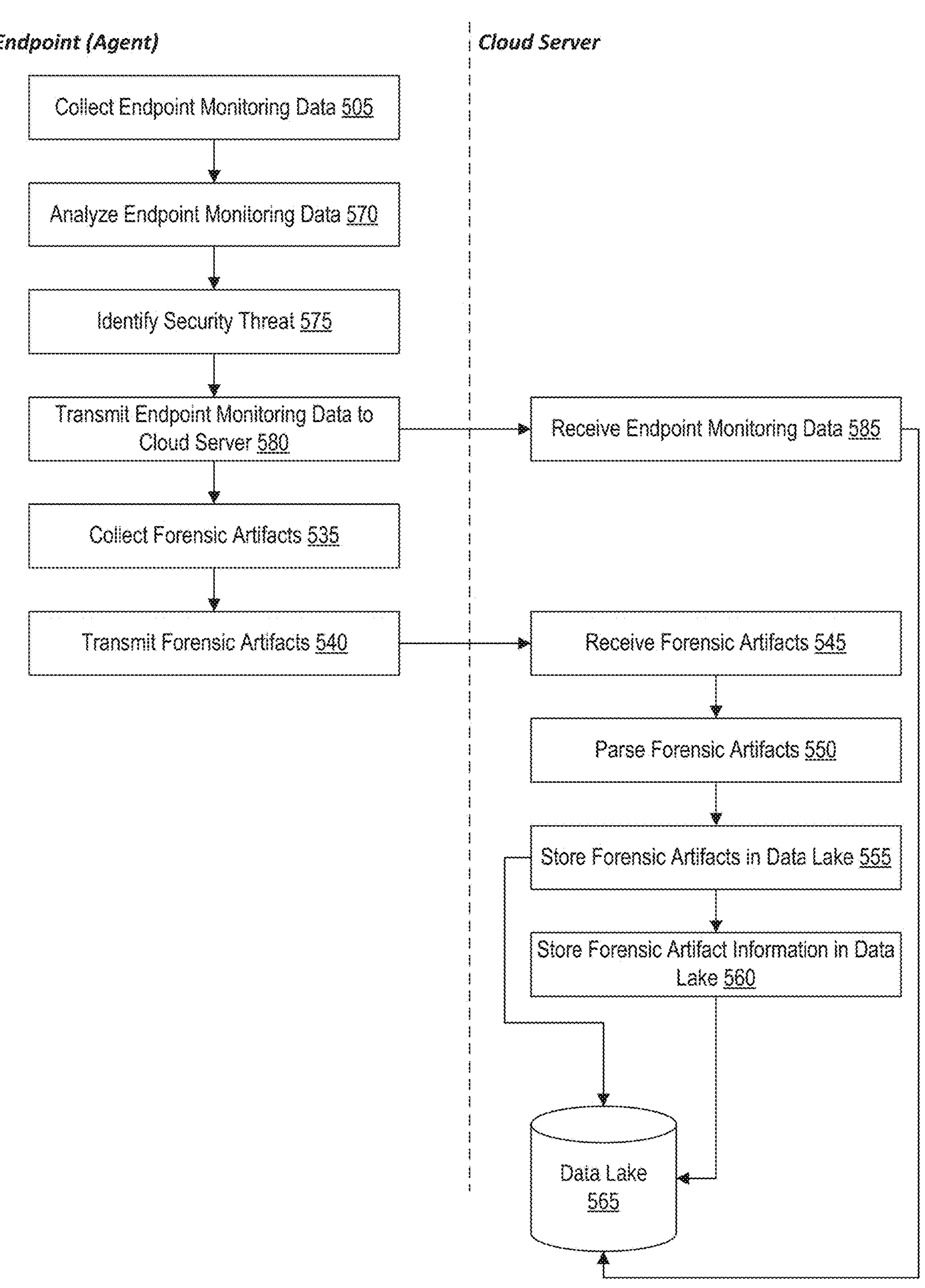

FIGS. 5A and 5B are flowcharts that illustrate example processes for detecting security threats and collecting forensic artifacts according to some embodiments. As shown in FIG. 5A, an agent running on an endpoint can collect endpoint monitoring data at operation 505. At operation 510, the agent can transfer the endpoint monitoring data to a cloud server. At operation 515, the cloud server can receive the endpoint monitoring data and, at operation 520, can analyze the endpoint monitoring data to identify a security threat. The cloud server can store the endpoint monitoring data in a data lake 565. At operation 525, the cloud server can notify the endpoint (e.g., the agent running on the endpoint) of the security threat. At operation 530, the endpoint (e.g., the agent running on the endpoint) can receive the notification of the security threat. In some embodiments, the notification indicates a type of security threat, which can be used to determine forensic artifacts to collect. For example, in some embodiments, the agent is configured with pre-defined rules for collecting forensic artifacts. The pre-defined rules can be based on the type of security threat. In some embodiments, the cloud server transmits an indication of the pre-defined rule as part of the notification. In some embodiments, the notification comprises the pre-defined rule (e.g., the cloud server sends the rule itself to the agent running on the endpoint. At operation 535, the agent can collect forensic artifacts. At operation 540, the agent can transmit the forensic artifacts to the cloud server. In some embodiments, the agent transmits the forensic artifacts to a server that is different from the server that receives the endpoint monitoring data. In some embodiments, the notification includes an address of a destination server (e.g., an address to a storage location such as an Amazon® S3 bucket). In some embodiments, the notification includes a credential for accessing a storage location, such as a username and password, token, key, etc. At operation 545, the cloud server can receive the forensic artifacts. At operation 550, the cloud server can parse the forensic artifacts, for example to extract certain information from the artifacts. As described herein, in some embodiments, different types of forensic artifacts are transferred in separate threads. Different types of forensic artifacts can be parsed differently when received by the cloud server. For example, network logs may be processed differently from memory dumps, process logs, etc. At operation 555, the cloud server can store the forensic artifacts data in the data lake 565. In some embodiments, forensic artifacts are stored and then parsed. In some embodiments, forensic artifacts are parsed before being stored. At operation 560, the cloud server can store forensic artifact information (e.g., as determined by parsing at operation 550) in the data lake 565.

FIG. 5B is similar to FIG. 5A, except that identifying security threats is carried out by the agent running on the endpoint, as opposed to being identified by the cloud server. Local detection (e.g., by the agent on the endpoint) can have certain advantages. For example, network access is not needed, and detection can be faster as there is no need to transfer data to a cloud server and wait for a response. However, detection capabilities including in an agent may be more limited, for example because of more limited resources on the endpoint as compared to the cloud server or because the endpoint has access to a more limited set of data (e.g., only monitoring data for the endpoint), while the cloud server can analyze data received from multiple endpoints, which could indicate, for example, a larger or more coordinated attack. For brevity, only operations that are different from those shown in FIG. 5A are described herein. At operation 570, the agent analyzes endpoint monitoring data and, at operation 575, the agent identifies a security threat based on the analysis of the endpoint monitoring data. At operation 580, the agent transmits the endpoint monitoring data to a cloud server, which receives the endpoint monitoring data at operation 585 and stores the data in the data lake 565.

Figure 6:
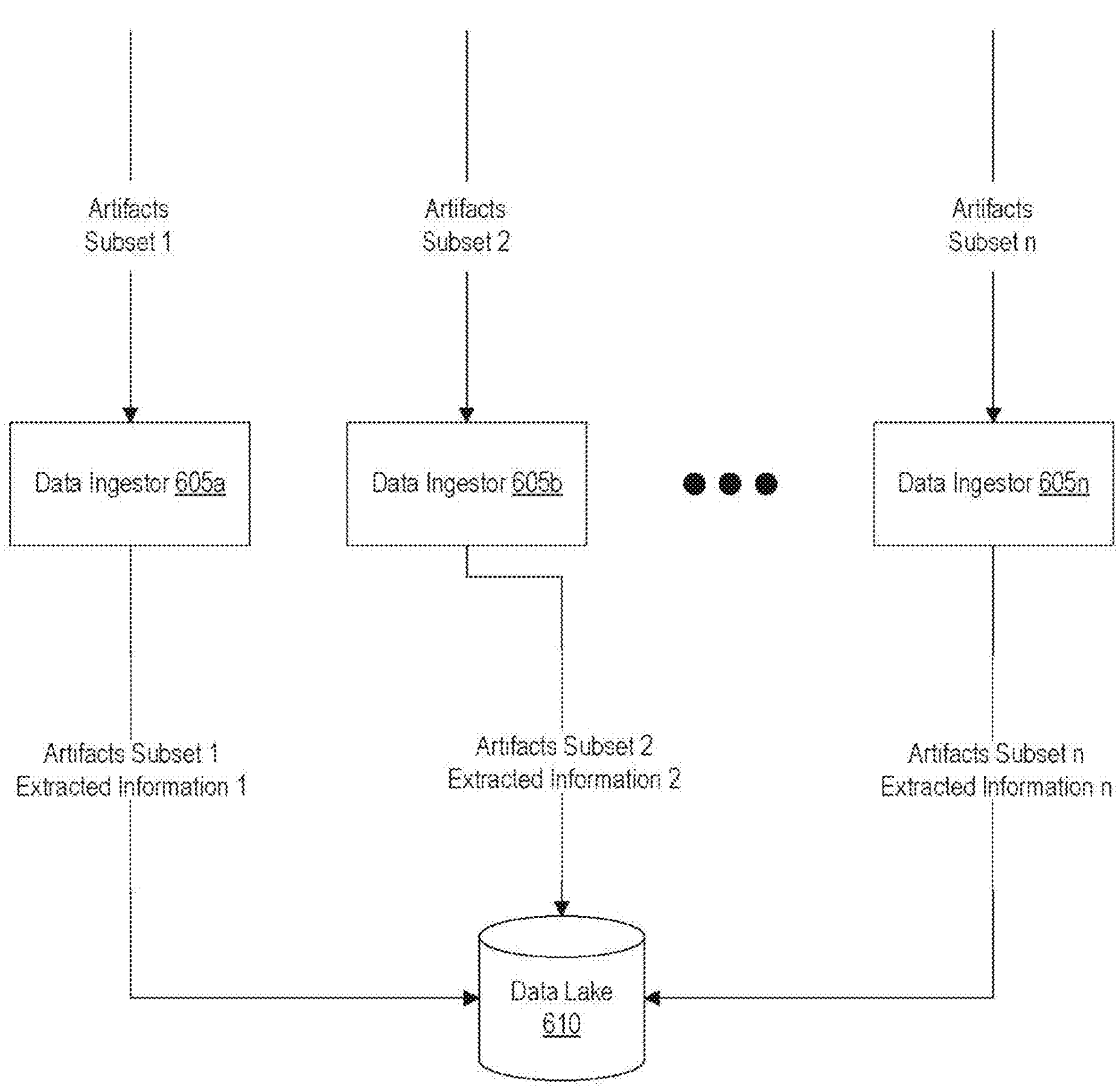
FIG. 6 is a diagram that illustrates an example of data ingestion according to some embodiments.

FIG. 6 is a diagram that illustrates an example of data ingestion according to some embodiments. As described herein, forensic artifacts can have a variety of data types. For example, forensic artifacts can include network logs, memory dumps, master file tables, file access logs, system logs, application logs, browser histories, cookies, stored logins, and so forth. Different types of forensic artifacts can be structured differently. When forensic artifacts are transmitted from an endpoint (e.g., via an agent) to a cloud server, it can be important to process the received forensic artifacts, for example to store them in particular locations in a data lake, to extract certain information from the forensic artifacts, which can enable analysis of the forensic artifacts, searching, etc. As described herein, forensic artifacts can be divided into subsets, for example based on types. Each subset can be uploaded to the cloud server, either in serial or in parallel. Each subset of artifacts can be processed by a data ingestor 605*a*-605*n*. The forensic artifact subsets 1-*n*, extracted information 1-*n* (e.g., information determined via processing the forensic artifact subsets 1-*n*), or both can be stored in the data lake 610.

Figure 7:
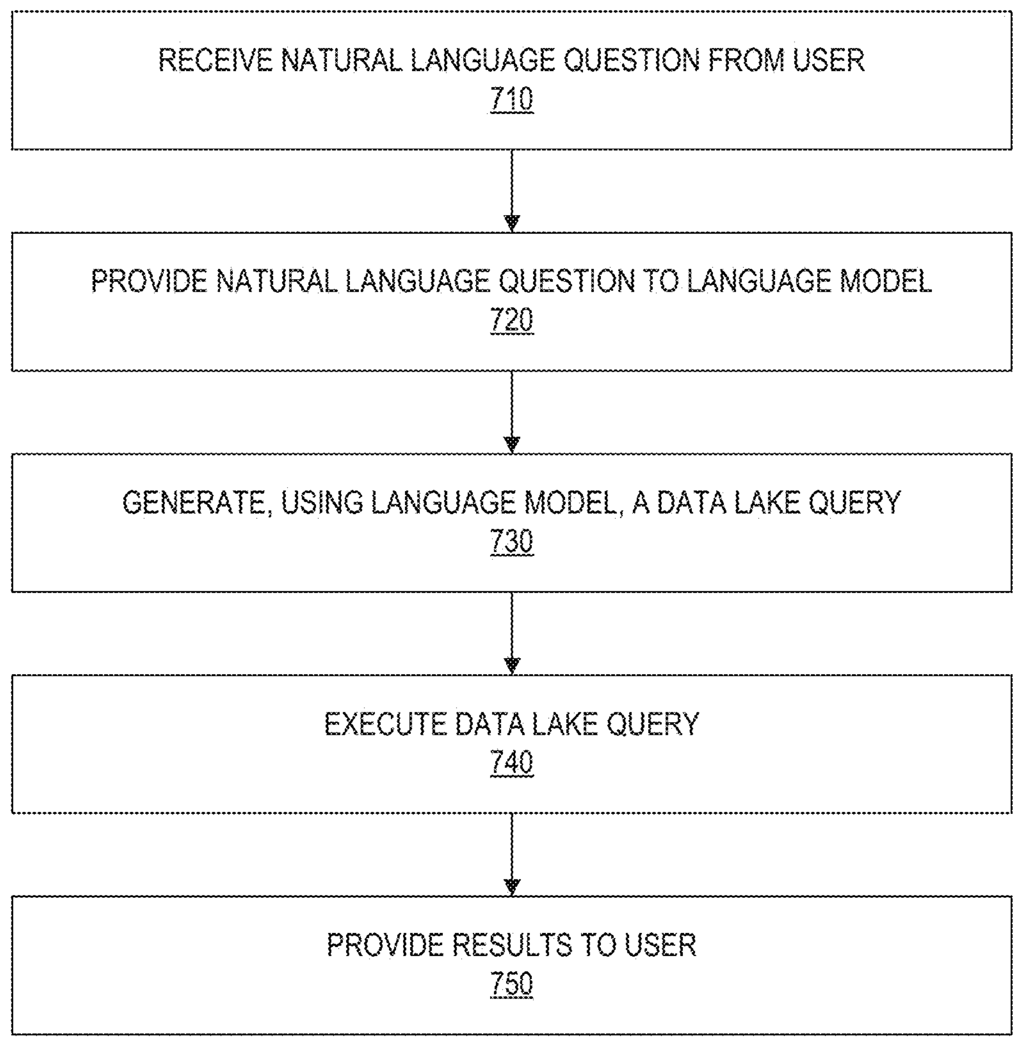
FIG. 7 is a flow chart that illustrates an example query generation and execution process according to some embodiments.

FIG. 7 is a flow chart that illustrates an example query generation and execution process according to some embodiments. At operation 710, a cloud service can receive a natural language question from a user. At operation 720, the cloud service can provide the natural language question to a language model. At operation 730 the cloud service can generate, using the language model, a data lake query. In some embodiments, the cloud service may provide the generated data lake query to a user, and the user may edit the data lake query. At operation 740, the cloud service can execute the data lake query. At operation 750, the cloud service can provide results of the query to the user. In some embodiments, the results may be presented in a web page, desktop application, mobile application, terminal application, etc. In some embodiments, the results may be provided in the form of an SQL file, JSON file, etc., and the user may load the results into another application for further analysis.

Enabling users to explore data using natural language queries can be of great value, as users do not have to know precise terms, data structures, and so forth. For example, a user does not necessarily need to know the specific terminology used in logs or specific schema information for the data lake. However, natural language querying presents several challenges. For example, a large language model trained on a wide range of training data may not be specialized for use in security research and may misinterpret a user's question. As another example, a large language model may not have specific knowledge of the data lake schema, which can make it difficult or impossible for the LLM to generate data lake queries that are executable and that return relevant results. In some embodiments, a system can use retrieval augmented generation (RAG) to improve query generation.

Figure 8:
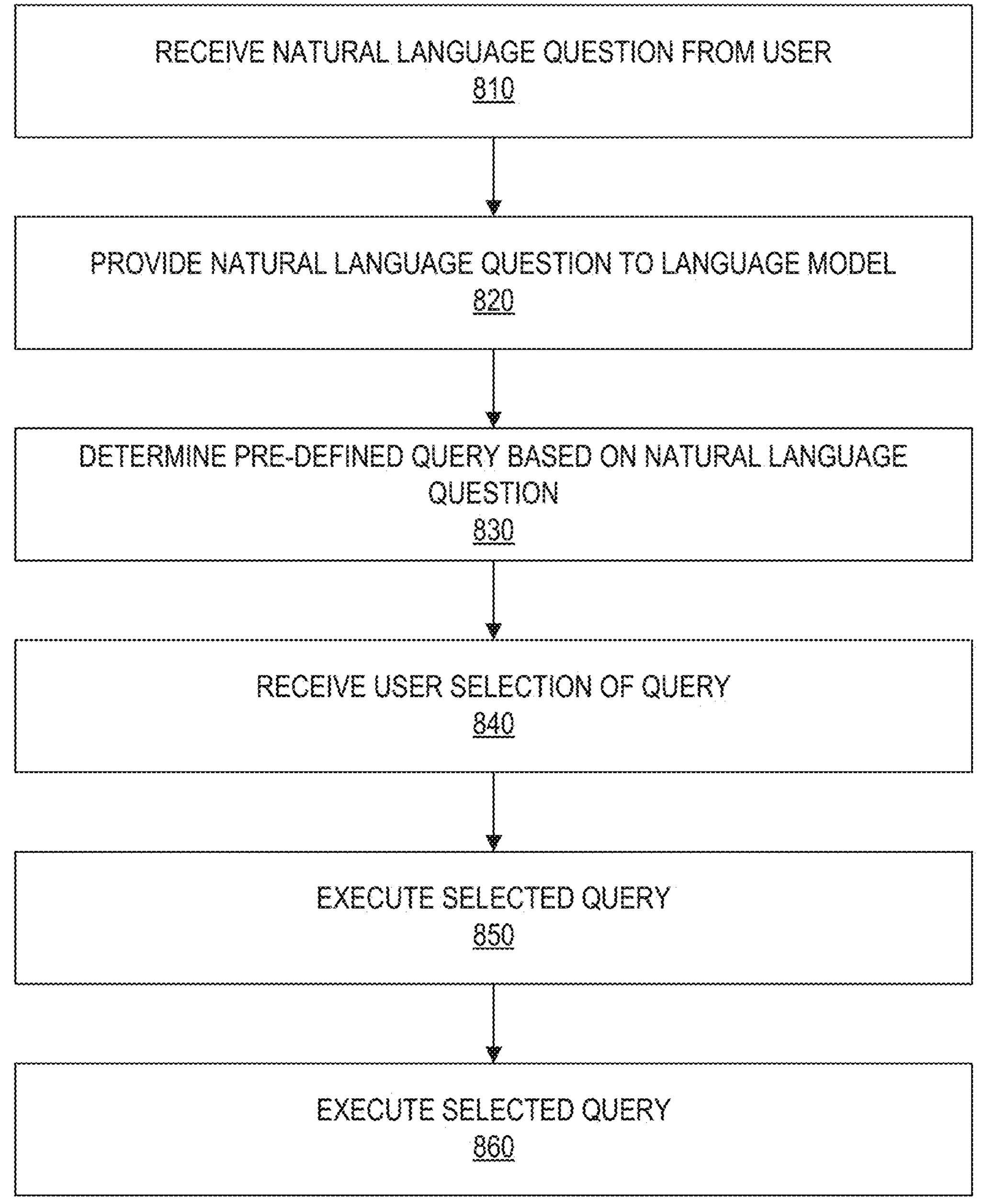
FIG. 8 is a flowchart that illustrates another process for querying a data lake based on natural language questions according to some embodiments.

FIG. 8 is a flowchart that illustrates another process for querying a data lake based on natural language questions according to some embodiments. At operation 810, a system can receive a natural language question from a user. At operation 820, the system can prove the natural language question to a language model (e.g., an LLM). In some embodiments, the system generates a prompt based on the natural language question. In some embodiments, the system utilizes retrieval augmented generation to provide contextual information to the LLM. At operation 830, the LLM can determine one or more pre-defined queries based on the natural language question. The system can cause the one or more pre-defined queries (or descriptions thereof) to the user. At operation 840, the system can receive a user selection of a query to execute. At operation 850, the system can execute the selected query against the data lake. At operation 860, the system can make the results of the query available to the user.

Figure 9:
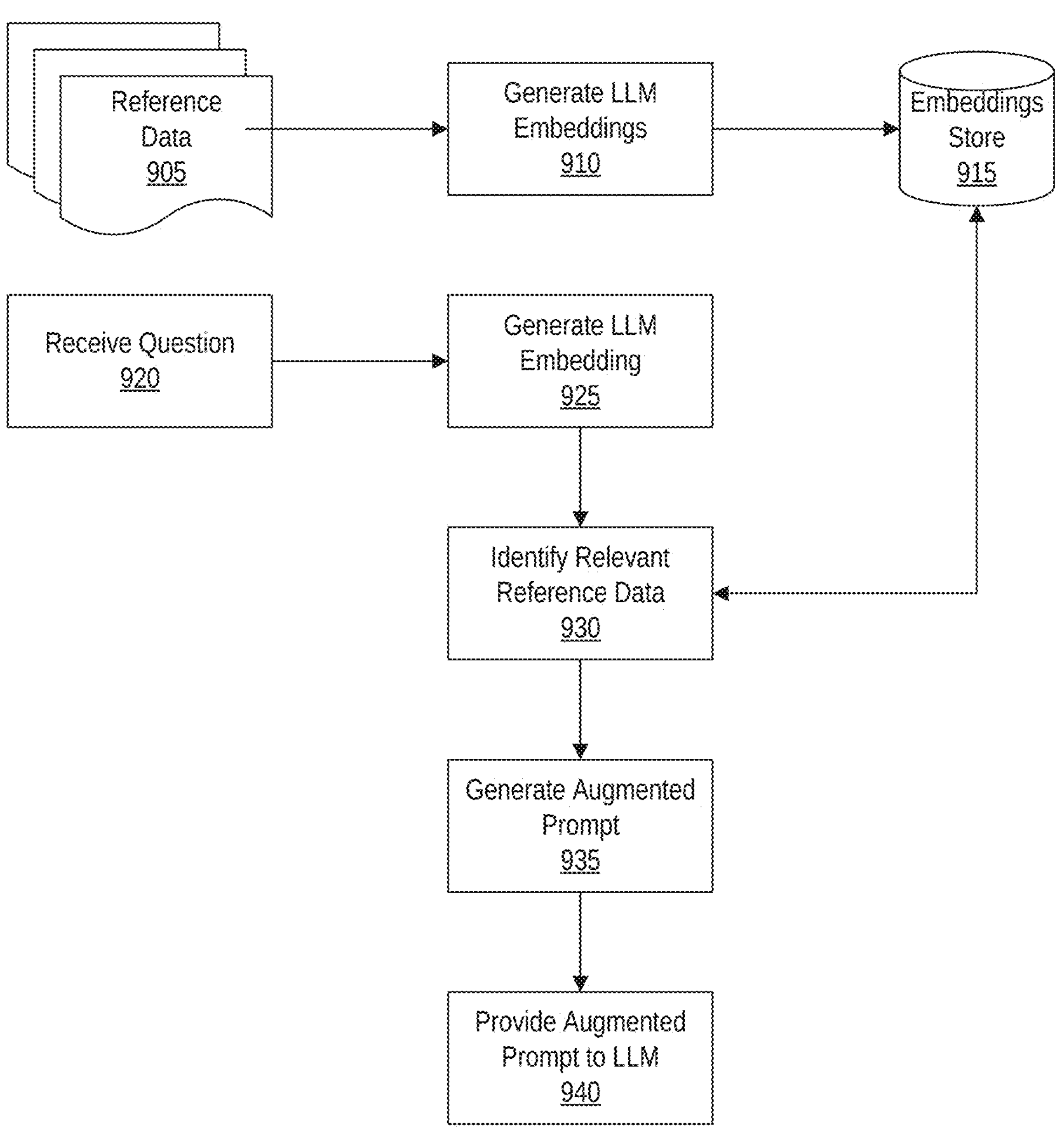
FIG. 9 is a flowchart that illustrates an example process for generating augmented queries using retrieval augmented generation according to some embodiments.

FIG. 9 is a flowchart that illustrates an example process for generating augmented queries using retrieval augmented generation according to some embodiments. At operation 910, a system can generate LLM embeddings for reference data 905. The reference data can include, for example, event logs, monitoring data, security documentation, operating system documentation, security advisories, malware definitions, and so forth. The system can store the generated embeddings in an embeddings store 915. The embeddings store can be a database or other data store.

At operation 920, the system can receive a question. For example, a user can submit a question via a web interface, desktop application, mobile application, etc. At operation 925, the system can generate an LLM embedding of the received question. At operation 930, the system can identify relevant reference data, for example by comparing the embedding of the received question and the embeddings in the embeddings store. In some embodiments, the comparison utilizes cosine similarity, L1 distance, or L2 distance. The relevant reference data can be identified based on the highest similarity. At operation 935, the system can generate an augmented prompt. At operation 940, the system can provide the augmented prompt to an LLM.

As an example, consider a user question such as "Is there evidence of Malware X in this data?" RAG can be used to retrieve information such as CISA alerts, blog posts, and so forth, that can be used to augment the question. For example, the retrieved information can provide information such as how Malware X is spread, network traffic patterns associated with Malware X, behavior information about Malware X, and so forth. As an example, an augmented query could be, "Malware X is typically spread through malicious e-mail attached, particularly Microsoft Word documents that contain macros. Malware X communicates with known command and control servers such as xxx.xxx.xxx and yyy.yyy.yyy.yyy. Malware X uses HTTP POST requests to exfiltrate data. Malware X attempts to move laterally within networks. Given this context, analyze the data to determine if there is evidence of Malware X."

Figure 10:
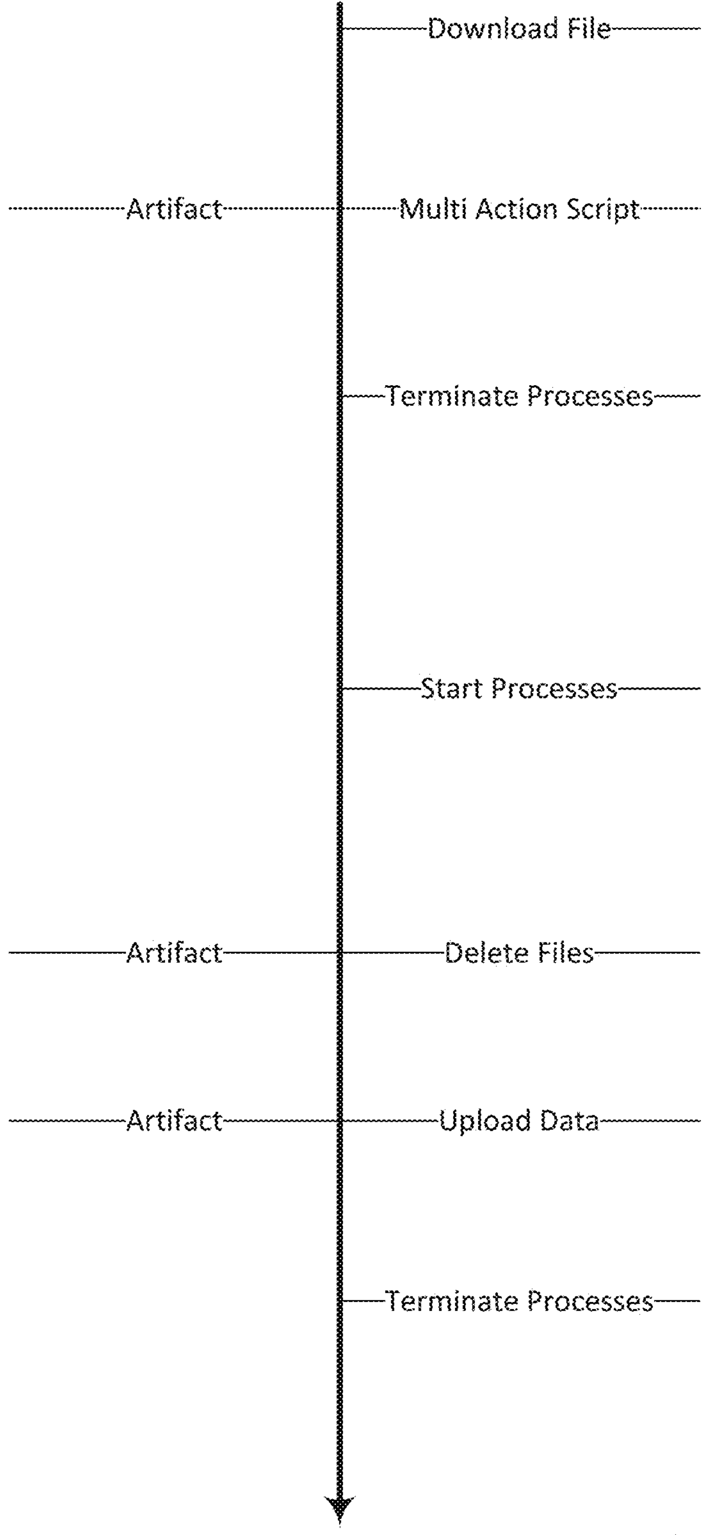

FIGS. 10 and 11 illustrate example timelines according to some embodiments. FIG. 10 illustrates a graphical timeline view, while FIG. 11 illustrates a tabular view. In FIGS. 10 and 11, the timeline includes an indication of available forensic artifacts. In some embodiments, a user can click on or otherwise select an available artifact to view the artifact, to view information about the artifact, or both.

Machine Learning

Figure 12:
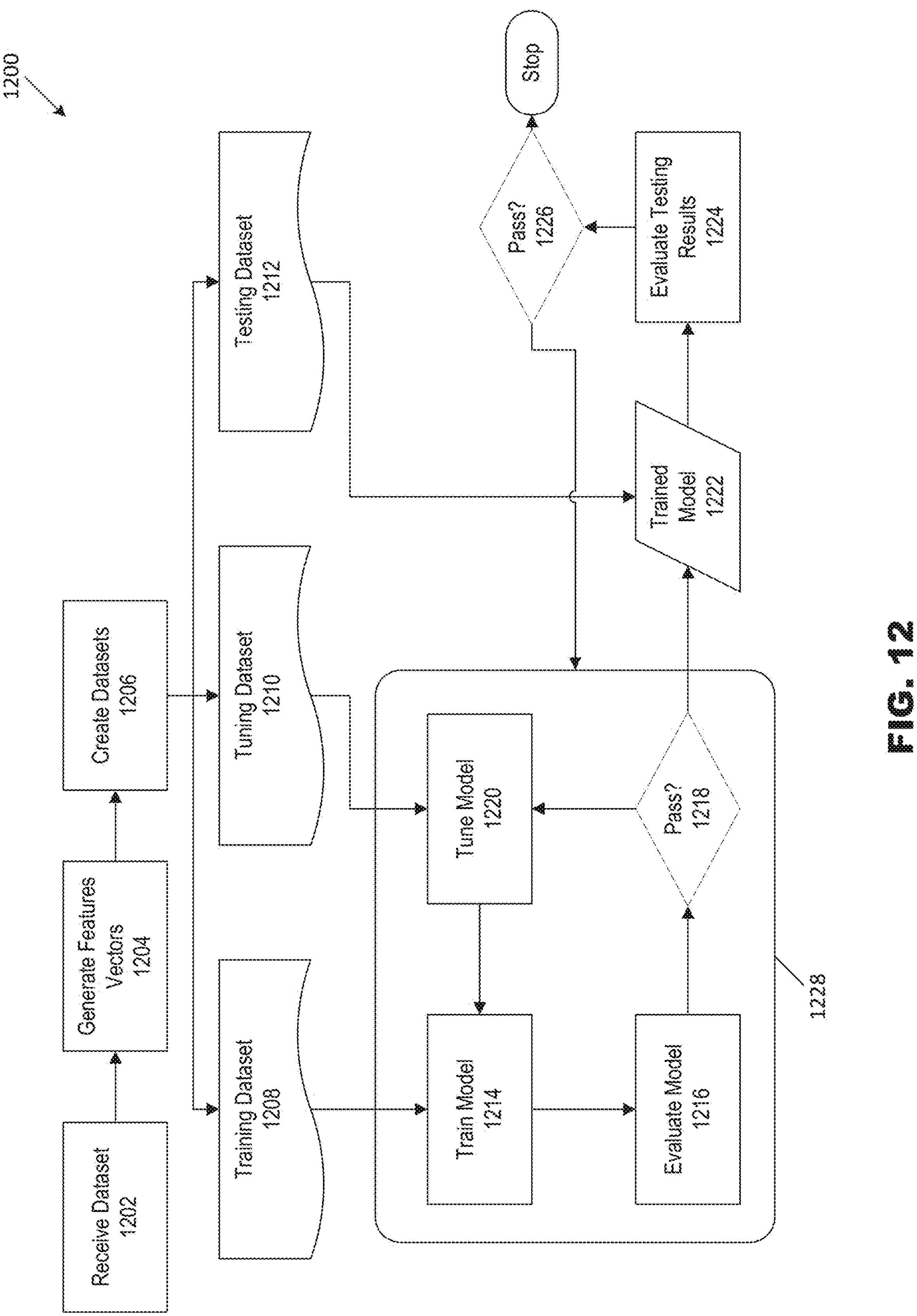
FIG. 12 illustrates an example process for training a machine learning model according to some embodiments.

FIG. 12 depicts a process for training an artificial intelligence or machine learning model according to some embodiments. The process 1200 can be run on a computing system. At block 1202, the system may access or receive a dataset. The dataset may include a plurality of queries and natural language questions. In some embodiments, the samples can be classified or labeled. For example, each sample may be classified as a relevant query or an irrelevant query. At block 1204, the system can generate feature vectors. In some embodiments, to generate the feature vectors, the system can perform one or more transformations or manipulations, such as extracting information from files, registry keys, and so forth. Data may require transformations to conform to expected input formats, for example to conform with expected date and/or time formatting. Strings and/or other information may be modified prior to use in machine learning training. For example, categorical data may be encoded in a particular manner, such as using one-hot encoding. Nominal data may be encoded using one-hot encoding, binary encoding, feature hashing, or other suitable encoding methods. Ordinal data may be encoded using ordinal encoding, polynomial encoding, Helmert encoding, and so forth. Numerical data may be normalized, for example by scaling data to a maximum of 1 and a minimum of 0 or −1. These are merely examples, and the skilled artisan will readily appreciate that other transformations are possible. At block 1206, the system may create, from the received dataset, training, tuning, and testing/validation datasets. The training dataset 1208 may be used during training to determine features for forming a predictive model. The tuning dataset 1210 may be used to select final models and to prevent or correct overfitting that may occur during training with the training dataset 1208, as the trained model should be generally applicable to a broad range of input data, not merely to data used for model training. The testing dataset 1212 may be used after training and tuning to evaluate the model. For example, the testing dataset 1212 may be used to check if the model is overfitted to the training dataset. The system, in training loop 1228, may train the model at block 1214 using the training dataset 1208. Training may be conducted in a supervised, unsupervised, or partially supervised manner. According to various embodiments herein, models can be trained in a supervised manner. At operation 1216, the system may evaluate the model according to one or more evaluation criteria. For example, the evaluation may include determining how often a model produces useful queries from a supplied natural language question, how often the model produces unsuitable queries, and so forth. At decision point 1218, the system may determine if the model meets the one or more evaluation criteria. If the model fails evaluation, the system may, at operation 1220, tune the model using the tuning dataset 1210, repeating the training block 1214 and evaluation block 1216 until the model passes the evaluation at decision 1218. Once the model passes the evaluation at decision 1218, the system may exit the model training loop 1228. The testing dataset 1212 may be run through the trained model 1222 and, at block 1224, the system may evaluate the results. If the evaluation fails, at decision 1226, the system may reenter training loop 1228 for additional training and tuning. If the model passes, the system may stop the training process, resulting in a trained model 1222. In some embodiments, the training process may be modified. For example, the system may not use a tuning dataset 1210. In some embodiments, the model may not use a testing dataset 1212.

Computer Systems

For simplicity, reference is made in this application to singular computer systems. However, unless context indicates otherwise, systems and methods described herein can be embodied or carried out on a single computer system or multiple computer systems. Computer systems can include physical computer systems, virtual computer systems (e.g., virtual machines), or both. The methods herein can, in some embodiments, be carried out in containers, which can act as a silo for running an application or applications on a host operating system. In some embodiments, a computer system can be headless and may not include a display device. In some embodiments, a computer system may not include or be connected (e.g., directly connected via a wired or wireless connection) to an input device such as a mouse or keyboard.

Figure 13:
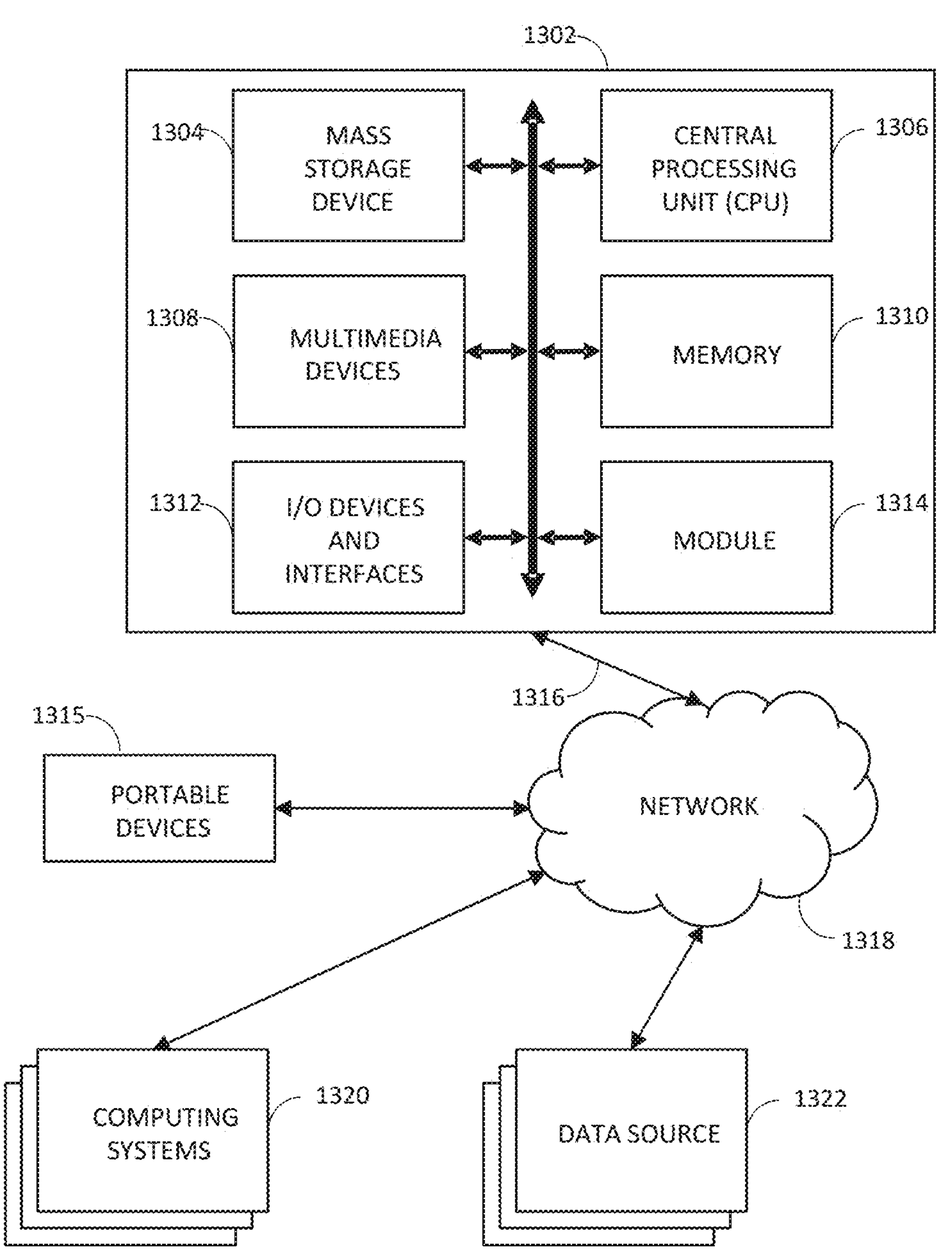
FIG. 13 is a block diagram depicting an embodiment of a computer hardware system configured to run software for implementing one or more embodiments disclosed herein.

FIG. 13 is a block diagram depicting an embodiment of a computer hardware system configured to run software for implementing one or more embodiments disclosed herein.

In some embodiments, the systems, processes, and methods described herein are implemented using a computing system, such as the one illustrated in FIG. 13. The example computer system 1302 is in communication with one or more computing systems 1320 and/or one or more data sources 1322 via one or more networks 1318. While FIG. 13 illustrates an embodiment of a computing system 1302, it is recognized that the functionality provided for in the components and modules of computer system 1302 may be combined into fewer components and modules, or further separated into additional components and modules.

The computer system 1302 can comprise a conditional policy engine 1314 that carries out the functions, methods, acts, and/or processes described herein. The conditional policy engine 1314 is executed on the computer system 1302 by a central processing unit 1306 discussed further below.

In general, the word "module," as used herein, refers to logic embodied in hardware or firmware or to a collection of software instructions, having entry and exit points. Modules are written in a program language, such as JAVA, C or C++, Python, or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 1302 includes one or more processing units (CPU) 1306, which may comprise a microprocessor. The computer system 1302 further includes a physical memory 1310, such as random-access memory (RAM) for temporary storage of information, a read only memory (ROM) for permanent storage of information, and a mass storage device 1304, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 1302 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 1302 includes one or more input/output (I/O) devices and interfaces 1312, such as a keyboard, mouse, touch pad, and printer. The I/O devices and interfaces 1312 can include one or more display devices, such as a monitor, which allows the visual presentation of data to a user. More particularly, a display device provides for the presentation of GUIs as application software data, and multi-media presentations, for example. The I/O devices and interfaces 1312 can also provide a communications interface to various external devices. The computer system 1302 may comprise one or more multi-media devices 1308, such as speakers, video cards, graphics accelerators, and microphones, for example.

The computer system 1302 may run on a variety of computing devices, such as a server, a Windows server, a Structure Query Language server, a Unix Server, a personal computer, a laptop computer, and so forth. In other embodiments, the computer system 1302 may run on a cluster computer system, a mainframe computer system and/or other computing system suitable for controlling and/or communicating with large databases, performing high volume transaction processing, and generating reports from large databases. The computing system 1302 is generally controlled and coordinated by an operating system software, such as Windows XP, Windows Vista, Windows 7, Windows 8, Windows 10, Windows 13, Windows Server, Unix, Linux (and its variants such as Debian, Linux Mint, Fedora, and Red Hat), SunOS, Solaris, Blackberry OS, z/OS, iOS, macOS, or other operating systems, including proprietary operating systems. Operating systems control and schedule computer processes for execution, perform memory management, provide file system, networking, and I/O services, and provide a user interface, such as a graphical user interface (GUI), among other things.

The computer system 1302 illustrated in FIG. 13 is coupled to a network 1318, such as a LAN, WAN, or the Internet via a communication link 1316 (wired, wireless, or a combination thereof). Network 1318 communicates with various computing devices and/or other electronic devices. Network 1318 is communicating with one or more computing systems 1320 and one or more data sources 1322. The conditional policy engine 1314 may access or may be accessed by computing systems 1320 and/or data sources 1322 through a web-enabled user access point. Connections may be a direct physical connection, a virtual connection, and other connection type. The web-enabled user access point may comprise a browser module that uses text, graphics, audio, video, and other media to present data and to allow interaction with data via the network 1318.

Access to the conditional policy engine 1314 of the computer system 1302 by computing systems 1320 and/or by data sources 1322 may be through a web-enabled user access point such as the computing systems' 1320 or data source's 1322 personal computer, cellular phone, smartphone, laptop, tablet computer, e-reader device, audio player, or another device capable of connecting to the network 1318. Such a device may have a browser module that is implemented as a module that uses text, graphics, audio, video, and other media to present data and to allow interaction with data via the network 1318.

The output module may be implemented as a combination of an all-points addressable display such as a cathode ray tube (CRT), a liquid crystal display (LCD), a plasma display, or other types and/or combinations of displays. The output module may be implemented to communicate with input devices 1312 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some embodiments, the system 1302 may comprise a physical or logical connection established between a remote microprocessor and a mainframe host computer for the express purpose of uploading, downloading, or viewing interactive data and databases on-line in real time. The remote microprocessor may be operated by an entity operating the computer system 1302, including the client server systems or the main server system, an/or may be operated by one or more of the data sources 1322 and/or one or more of the computing systems 1320. In some embodiments, terminal emulation software may be used on the microprocessor for participating in the micro-mainframe link.

In some embodiments, computing systems 1320 who are internal to an entity operating the computer system 1302 may access the conditional policy engine 1314 internally as an application or process run by the CPU 1306.

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 1302 may include one or more internal and/or external data sources (for example, data sources 1322). In some embodiments, one or more of the data repositories and the data sources described above may be implemented using a relational database, such as Sybase, Oracle, CodeBase, DB2, PostgreSQL, and Microsoft® SQL Server as well as other types of databases such as, for example, a NoSQL database (for example, Couchbase, Cassandra, or MongoDB), a flat file database, an entity-relationship database, an object-oriented database (for example, InterSystems Caché), a cloud-based database (for example, Amazon RDS, Azure SQL, Microsoft Cosmos DB, Azure Database for MySQL, Azure Database for MariaDB, Azure Cache for Redis, Azure Managed Instance for Apache Cassandra, Google Bare Metal Solution for Oracle on Google Cloud, Google Cloud SQL, Google Cloud Spanner, Google Cloud Big Table, Google Firestore, Google Firebase Realtime Database, Google Memorystore, Google MongoDB Atlas, Amazon Aurora, Amazon DynamoDB, Amazon Redshift, Amazon ElastiCache, Amazon MemoryDB for Redis, Amazon DocumentDB, Amazon Keyspaces, Amazon Neptune, Amazon Timestream, or The computer system 1302 may also access one or more databases 1322. The databases 1322 may be stored in a database or data repository. The computer system 1302 may access the one or more databases 1322 through a network 1318 or may directly access the database or data repository through I/O devices and interfaces 1312. The data repository storing the one or more databases 1322 may reside within the computer system 1302.

Additional Embodiments

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will also be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A computer-implemented method for forensic artifact collection, the computer-implemented method comprising:

collecting, by an agent installed on an endpoint, endpoint monitoring data;

transmitting, by the agent over a network, the endpoint monitoring data to a cloud server;

receiving, by the agent from the cloud server over the network, an indication of a security incident, wherein the security incident is determined based at least in part on the endpoint monitoring data; and in response to receiving the indication of the security incident:

identifying, by the agent, a set of forensic artifact types;

determining, by the agent, a set of forensic artifacts, wherein each forensic artifact of the set of forensic artifacts is associated with at least one forensic artifact type of the set of forensic artifact types;

generating one or more batches, wherein each batch of the one or more batches comprises a subset of the set of forensic artifacts, wherein each batch of the one or more batches has a batch size that is less than or equal to a maximum batch size, and wherein the maximum batch size is based at least in part on an amount of random access memory of the endpoint;

transmitting, by the agent, the set of forensic artifacts to a destination server, wherein transmitting the set of forensic artifacts comprises transmitting the one or more batches, wherein the set of forensic artifacts is stored in random access memory, wherein identifying the set of forensic artifact types, determining the set of forensic artifacts, and transmitting the set of forensic artifacts to the destination server are performed without writing to a non-volatile storage medium of the endpoint.

2. The computer-implemented method of claim 1, wherein the set of forensic artifacts is determined based at least in part on the endpoint monitoring data, wherein the endpoint monitoring data indicates at least one of a file operation or a network operation.

3. The computer-implemented method of claim 1, wherein the indication of the security incident comprises an indication of a type of the security incident, wherein determining the set of forensic artifacts is based at least in part on the type of the security incident.

4. The computer-implemented method of claim 3, wherein to determine the set of forensic artifacts, the computer-implemented method further comprises:

determining a pre-defined rule based on the type of the security incident, wherein the pre-defined rule specifies at least one of: a type of forensic artifact to collect, a log to collect, or a file to collect.

5. The computer-implemented method of claim 1, wherein transmitting the set of forensic artifacts to the destination server comprises:

creating a plurality of threads, wherein a number of threads in the plurality of threads is based on a number of forensic artifact types included in the set of forensic artifact types;

wherein each thread of the plurality of threads is configured to transmit forensic artifacts having a particular forensic artifact type, wherein transmitting forensic artifacts having the particular forensic artifact type comprises transmitting an indication of the particular forensic artifact type to the destination server.

6. The computer-implemented method of claim 1, further comprising receiving an indication of a network address of the destination server.

7. The computer-implemented method of claim 6, further comprising receiving a credential for accessing the destination server.

8. The computer-implemented method of claim 1, wherein the set of forensic artifacts comprises forensic artifacts created from an initial time to a current time, wherein the initial time is correlated with a time when the agent began operating on the endpoint.

9. The computer-implemented method of claim 1, wherein transmitting the set of forensic artifacts comprises transmitting a memory dump before transmitting other forensic artifacts of the set of forensic artifacts.

10. The computer-implemented method of claim 1, further comprising:

receiving, from the cloud server, a destination address for receiving the set of forensic artifacts; and receiving, from the cloud server, a credential for transmitting the set of forensic artifacts to the destination address.

11. A system for forensic artifact collection, the system comprising:

at least one processor; and a non-volatile, computer-readable medium with instructions stored thereon which, when executed by the at least one processor, cause the system to:

collect, by an agent installed on the system, endpoint monitoring data;

transmit, by the agent over a network, the endpoint monitoring data to a cloud server;

receive, by the agent from the cloud server over the network, an indication of a security incident, wherein the security incident is determined based at least in part on the endpoint monitoring data; and in response to receiving the indication of the security incident:

identify, by the agent, a set of forensic artifact types;

determine, by the agent, a set of forensic artifacts, wherein each forensic artifact of the set of forensic artifacts is associated with at least one forensic artifact type of the set of forensic artifact types;

generate one or more batches, wherein each batch of the one or more batches comprises a subset of the set of forensic artifacts, wherein each batch of the one or more batches has a batch size that is less than or equal to a maximum batch size, and wherein the maximum batch size is based at least in part on an amount of random access memory of the system; and transmit, by the agent, the set of forensic artifacts to a destination server, wherein transmitting the set of forensic artifacts comprises transmitting the one or more batches, wherein the set of forensic artifacts is stored in random access memory, wherein identifying the set of forensic artifact types, determining the set of forensic artifacts, and transmitting the set of forensic artifacts to the destination server are performed without writing to a non-volatile storage medium of the system.

12. The system of claim 11, wherein the set of forensic artifacts is determined based at least in part on the endpoint monitoring data, wherein the endpoint monitoring data indicates at least one of a file operation or a network operation.

13. The system of claim 11, wherein the indication of the security incident comprises an indication of a type of the security incident, wherein determining the set of forensic artifacts is based at least in part on the type of the security incident.

14. The system of claim 13, wherein to determine the set of forensic artifacts, the instructions are further configured to cause the system to:

determine a pre-defined rule based on the type of the security incident, wherein the pre-defined rule specifies at least one of: a type of forensic artifact to collect, a log to collect, or a file to collect.

15. The system of claim 11, wherein transmitting the set of forensic artifacts to the destination server comprises:

creating a plurality of threads, wherein a number of threads in the plurality of threads is based on a number of forensic artifact types included in the set of forensic artifact types;

wherein each thread of the plurality of threads is configured to transmit forensic artifacts having a particular forensic artifact type, wherein transmitting forensic artifacts having the particular forensic artifact type comprises transmitting an indication of the particular forensic artifact type to the destination server.

16. The system of claim 11, wherein the instructions are further configured to cause the system to receive an indication of a network address of the destination server.

17. The system of claim 16, wherein the instructions are further configured to cause the system to receive a credential for accessing the destination server.

18. The system of claim 11, wherein the set of forensic artifacts comprises forensic artifacts created from an initial time to a current time, wherein the initial time is correlated with a time when the agent began operating on the system.

19. The system of claim 11, wherein transmitting the set of forensic artifacts comprises transmitting a memory dump before transmitting other forensic artifacts of the set of forensic artifacts.

20. The system of claim 11, wherein the instructions are further configured to cause the system to:

receive, from the cloud server, a destination address for receiving the set of forensic artifacts; and receive, from the cloud server, a credential for transmitting the set of forensic artifacts to the destination address.

* * * * *